(12) United States Patent
Kim et al.

(10) Patent No.: US 12,356,264 B2
(45) Date of Patent: Jul. 8, 2025

(54) DEVICE AND METHOD FOR MULTI-SIM WIRELESS COMMUNICATION

(71) Applicant: SAMSUNG ELECTRONICS CO., LTD., Suwon-si (KR)

(72) Inventors: Sangtae Kim, Suwon-si (KR); Jaehyung Lee, Hwaseong-si (KR); Youngyong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 428 days.

(21) Appl. No.: 17/804,375

(22) Filed: May 27, 2022

(65) Prior Publication Data

US 2022/0400418 A1 Dec. 15, 2022

(30) Foreign Application Priority Data

Jun. 10, 2021 (KR) .................. 10-2021-0075488
Aug. 9, 2021 (KR) .................. 10-2021-0104810

(51) Int. Cl.
*H04W 4/00* (2018.01)
*H04W 36/00* (2009.01)

(52) U.S. Cl.
CPC ... *H04W 36/0085* (2018.08); *H04W 36/0061* (2013.01)

(58) Field of Classification Search
CPC ......... H04W 36/0085; H04W 36/0061; H04W 48/16; H04W 8/183; H04W 48/20
See application file for complete search history.

(56) References Cited

U.S. PATENT DOCUMENTS

| 8,406,741 | B2 | 3/2013 | Kang et al. |
| 8,948,767 | B2 * | 2/2015 | Sridhar ........... H04W 36/00837 |
| | | | 455/437 |
| 9,125,107 | B1 * | 9/2015 | McMullen ............ H04W 64/00 |
| 9,319,977 | B2 | 4/2016 | Nayak et al. |
| 9,362,988 | B2 | 6/2016 | Soliman et al. |

(Continued)

FOREIGN PATENT DOCUMENTS

KR 10-1585467 1/2016

OTHER PUBLICATIONS

3GPP TS 36.304 version 16.3.0 Release 16, LTE; Evolved Universal Terrestrial Radio Access (E-UTRA); User Equipment (UE) procedures in idle mode (66 pages).

(Continued)

*Primary Examiner* — Stephen M D Agosta
(74) *Attorney, Agent, or Firm* — MORGAN, LEWIS & BOCKIUS LLP

(57) ABSTRACT

Provided are a user equipment (UE) supporting multi subscriber identity module (SIM) multi standby (MSMS), and an operating method of the UE. An operating method of a UE includes performing communication associated with a SIM of the UE with a network in a radio resource control (RRC) idle mode, triggering measurement of a neighbor cell based on a neighbor cell measurement rule that considers a measurement value of a serving cell signal and a number of cell reselection ping-pongs that occurred between the serving cell and the neighbor cell, and reselecting the neighbor cell based on at least one cell reselection criterion considering the measurement value and the number of cell reselection ping-pongs.

14 Claims, 10 Drawing Sheets

(56) References Cited

U.S. PATENT DOCUMENTS

| | | | |
|---|---|---|---|
| 10,172,060 B2 | 1/2019 | Raghunathan et al. | |
| 10,499,294 B1* | 12/2019 | Tayal | H04W 36/008375 |
| 10,523,375 B2 | 12/2019 | Dev et al. | |
| 11,012,872 B1* | 5/2021 | Bellamkonda | H04L 41/0823 |
| 11,297,597 B2* | 4/2022 | Lee | H04W 36/00 |
| 11,546,818 B2* | 1/2023 | Fujishiro | H04W 36/08 |
| 2010/0234026 A1* | 9/2010 | Tenny | H04W 36/0061 455/67.11 |
| 2011/0086635 A1* | 4/2011 | Grob-Lipski | H04W 36/00837 455/423 |
| 2012/0307791 A1* | 12/2012 | Veres | H04W 36/322 370/331 |
| 2013/0189996 A1* | 7/2013 | Sridhar | H04W 36/00837 455/444 |
| 2013/0208699 A1* | 8/2013 | Hakkinen | H04W 76/38 370/331 |
| 2014/0036874 A1* | 2/2014 | Jeong | H04W 36/00838 370/332 |
| 2014/0045500 A1* | 2/2014 | Dimou | H04W 36/302 455/436 |
| 2014/0148213 A1* | 5/2014 | Tinnakornsrisuphap | H04W 52/241 455/522 |
| 2014/0155065 A1* | 6/2014 | Centonza | H04W 36/0022 455/436 |
| 2014/0220973 A1* | 8/2014 | Lunden | H04W 36/324 455/436 |
| 2014/0274063 A1* | 9/2014 | Singh | H04W 36/362 455/437 |
| 2014/0274195 A1* | 9/2014 | Singh | H04W 52/285 455/522 |
| 2014/0349656 A1* | 11/2014 | Sfar | H04W 36/36 455/437 |
| 2015/0043529 A1* | 2/2015 | Kang | H04W 36/1443 370/331 |
| 2015/0146689 A1* | 5/2015 | Fu | H04J 3/0632 370/331 |
| 2015/0172966 A1* | 6/2015 | Watanabe | H04W 24/02 455/436 |
| 2015/0358868 A1* | 12/2015 | Wegmann | H04W 36/008375 455/436 |
| 2016/0066223 A1* | 3/2016 | Sawhney | H04W 36/00837 455/436 |
| 2016/0366621 A1 | 12/2016 | Sabapathi et al. | |
| 2017/0034745 A1* | 2/2017 | Dhanapal | H04W 36/34 |
| 2017/0303181 A1* | 10/2017 | Gupta | H04W 76/16 |
| 2018/0176834 A1* | 6/2018 | Wei | H04W 36/0066 |
| 2018/0206184 A1* | 7/2018 | Bahr | H04W 48/20 |
| 2019/0075469 A1* | 3/2019 | Mahoney | H04B 17/318 |
| 2019/0230626 A1* | 7/2019 | Rune | H04W 72/046 |
| 2019/0320367 A1* | 10/2019 | Zetterberg | H04W 36/0072 |
| 2020/0045593 A1* | 2/2020 | Jung | H04W 24/10 |
| 2020/0077325 A1* | 3/2020 | Jangid | H04W 48/16 |
| 2020/0084678 A1* | 3/2020 | Gunnarsson | H04W 36/0085 |
| 2020/0267605 A1* | 8/2020 | Bae | G06F 9/547 |
| 2020/0323005 A1* | 10/2020 | Chin | H04W 36/00837 |
| 2020/0374180 A1* | 11/2020 | Jain | H04L 41/0654 |
| 2020/0396714 A1 | 12/2020 | Lee | |
| 2021/0051444 A1* | 2/2021 | Ryu | G01S 19/47 |

OTHER PUBLICATIONS

3GPP TS 38.304 version 16.4.0 Release 16, 5G; NR; User Equipment (UE) procedures in idle mode and in RRC Inactive state (41 pages).
Bhushan, et al., "5G Air Interface System Design Principles", IEEE Wireless Communications, Oct. 2017, pp. 6-8.
Park, et al., "Handover Mechanism in NR for Ultra-Reliable Low-Latency Communications", IEEE Network 32(2):41-47, Mar. 2018.
Pathak, et al., "Efficient Protocol for Performance Enhancement of B4G and 5G Networks for MultiSIM Deployment", Conference: 2019 16th IEEE Annual Consumer Communications & Networking Conference (CCNC), Jan. 2019, 6 pages.
Lin, et al., "Validation of an improved location-based handover algorithm using GSM measurement data", IEEE Transactions on Mobile Computing, vol. 4, No. 5, Sep./Oct. 2005, pp. 530-536.
Rasmussen, et al., Ping-Pong Effects in Linear Parallel Interference Cancellation for CDMA, IEEE Transactions on Wireless Communications, vol. 2, No. 2, Mar. 2003, pp. 357-363.
Calabrese, et al., "Performance Evaluation of Received Signal Strength Based Hard Handover for UTRAN LTE", Computer Science, Business, 2007 IEEE 65th Vehicular Technology Conference, Published Apr. 22, 2007, pp. 1046-1050.
Qu, et al. "Cell selection analysis in outdoor heterogeneous networks", 3rd International Conference on Advanced Computer Theory and Engineering(ICACTE), 2010, pp. V5-554-V5-557.
Radio Communication Test Station MT8000A with RF Chamber MA8171A CATR Anechoic Chamber MA8172A Shield Box MA8161A, 46 pages.
Signalling Tester (Base Station Simulator) MD8475B, 19 Pages.
Turkka, et al., "Self-optimization of LTE Mobility State Estimation Thresholds", IEEE Wireless Communications and Networking Conference Workshops (WCNCW), Apr. 6-9, 2014, pp. 161-165.

* cited by examiner

DEVICE AND METHOD FOR MULTI-SIM WIRELESS COMMUNICATION

CROSS-REFERENCE TO RELATED APPLICATIONS

This application is based on and claims priority under 35 U.S.C. § 119 to Korean Patent Application No. 10-2021-0075488, filed on Jun. 10, 2021, and Korean Patent Application No. 10-2021-0104810, filed on Aug. 9, 2021, in the Korean Intellectual Property Office, the disclosures of which are incorporated by reference herein in their entireties.

TECHNICAL FIELD

This disclosure relates generally to wireless communications and more particularly to cell reselection and a method and device for multiple-subscriber identity module (SIM) wireless communications.

DISCUSSION OF THE RELATED ART

Multiple subscriber identity module (SIM) devices ("multi-SIM devices") such as mobile phones, personal digital assistants, tablets, laptops, etc., sometimes called user equipments (UEs), include two or more SIMs, e.g., SIM cards. Each SIM may include unique international mobile subscriber identity (IMSI) information, and key information that allows a user of a multi-SIM device to be identified and authenticated by a service provider.

Multiple SIM wireless communication may enable a multi-SIM device to concurrently connect to two different network services and/or base stations (sometimes called "cells"). For example, the SIMs of the multi-SIM device may respectively correspond to different accounts and/or phone numbers, etc. The multi-SIM device may implement a plurality of protocol stacks to drive a plurality of wireless communications corresponding to the respective SIMs.

In a case where a UE supporting multi-SIMs is a dual SIM dual standby (DSDS) device, and radio frequency (RF) resource usage request periods of the SIMs overlap, because one of the SIMs may not be allocated with an RF resource at any given time, the communication performance of the multi-SIM device may be degraded.

For instance, a SIM in a DSDS device may perform a cell reselection operation to reselect a cell to "camp on" in RRC idle mode, from a first cell to a second cell in a similar electromagnetic field region. A "cell reselection ping-pong" occurs when another reselection thereafter occurs from the second cell back to the first cell. The cell reselection ping-pong may cause data communication to be interrupted in the other (peer) SIM. As a result, data throughput of the peer SIM may be reduced. Similarly, a "handover ping-pong" may be said to occur when a first handover of a communication in an RRC connection mode from the first cell to the second cell is followed by a second handover of the communication from the second cell back to the first cell. The handover ping-pong may excessively consume network resources as well as battery power in the UE.

SUMMARY

Embodiments of the inventive concept provide an improved cell reselection method capable of alleviating degradation due to a ping-pong sequence in a subscriber identity module (SIM) performing a cell reselection operation in a multi-SIM multi-standby (MSMS) device, and a multi-SIM device and an operating method thereof in which a network service is efficiently supported for a plurality of SIMs while improving data throughput of the MSMS device.

According to an aspect of the inventive concept, there is provided an operating method of a user equipment (UE), the operating method including: performing communication associated with a SIM of the UE with a network in a radio resource control (RRC) idle mode, triggering measurement of a neighbor cell signal based on a neighbor cell measurement rule that considers a measurement value of a serving cell signal and a number of cell reselection ping-pongs that occurred between the serving cell and the neighbor cell, and reselecting the neighbor cell based on at least one cell reselection criterion considering the measurement value and the number of cell reselection ping-pongs.

According to another aspect of the inventive concept, there is provided a UE supporting multi subscriber identity module (SIM) multi standby (MSMS), the UE including a first SIM configured to perform communication with a first base station in a radio resource control (RRC) idle mode, a second SIM configured to perform communication with a second base station in the RRC idle mode or in an RRC connected mode, a transceiver configured to allocate a radio frequency (RF) resource to one of the first SIM and the second SIM at a point in time, and a processor configured to determine whether to perform neighbor cell signal measurement based on a measurement value of a signal transmitted by the first base station, when a frequency priority of a neighbor base station is higher than a frequency priority of the first base station, and when neighbor cell signal measurement is performed as a result of the determination, to determine whether to perform cell reselection based on the measurement value of the base station and a measurement value of a signal transmitted by the neighbor base station.

According to another aspect of the inventive concept, there is provided a user equipment (UE) supporting multi subscriber identity module (SIM) multi standby (MSMS), the UE including a first SIM configured to perform communication with a serving cell in a radio resource control (RRC) idle mode, a second SIM configured to perform communication with a network in an RRC connected mode, and a processor configured to trigger measurement of a neighbor cell based on a neighbor cell measurement rule considering a measurement value of a serving cell signal and a number of cell reselection ping-pongs that occurred between the serving cell and the neighbor cell and to reselect the neighbor cell based on a plurality of cell reselection criteria considering the first measurement value and the number of cell reselection ping-pongs.

BRIEF DESCRIPTION OF THE DRAWINGS

Embodiments of the inventive concept will be more clearly understood from the following detailed description taken in conjunction with the accompanying drawings in which.

DETAILED DESCRIPTION OF EMBODIMENTS

Hereinafter, exemplary embodiments of the inventive concept will be described with reference to the accompanying drawings.

Herein, the phrase "measure a cell", in the context of a UE performing a measurement, is intended to mean "measure a signal transmitted by the cell". Some examples of such a signal measurement include a reference signal received power (RSRP) measurement and a reference signal received quality (RSRQ) measurement.

Herein, a "ping-pong" is a cell reselection ping-pong, unless the context indicates otherwise. A cell reselection ping-pong occurs after a first cell reselection from a first cell to a second cell in RRC idle mode is followed by a second cell reselection from the second cell back to the first cell.

Figure 1:
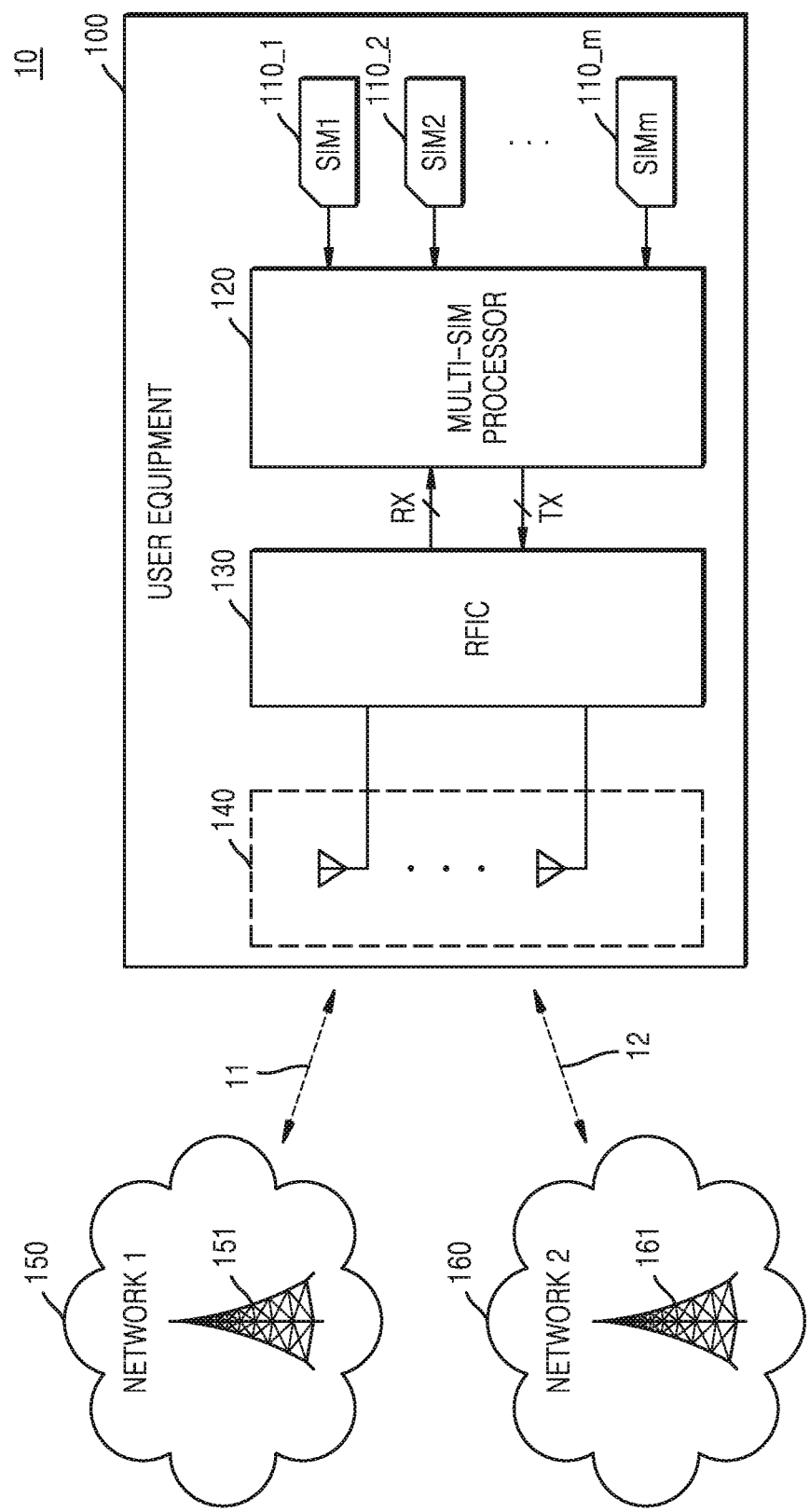
FIG. 1 is a block diagram schematically illustrating a wireless communication system according to an exemplary embodiment of the inventive concept.

FIG. 1 is a block diagram schematically illustrating a wireless communication system according to an exemplary embodiment of the inventive concept.

Referring to FIG. 1, a wireless communication system 10 may include a first network 150, a second network 160, and a user equipment (UE) 100.

The wireless communication system 10, as a non-limiting example, may be a $5^{th}$-Generation (5G) new radio (NR) wireless communication system, a $4^{th}$-Generation (4G) Long Term Evolution (LTE) wireless communication system, a Code Division Multiple Access (CDMA) system, a Wideband Code Division Multiple Access (WCDMA) system, a Global System for Mobile Communications (GSM) system, a Wireless Local Area Network (WLAN) system, or any other wireless communication system, and a wireless communication system in which a plurality of wireless communication methods described above are combined.

The UE 100, which is a wireless communication device, may be defined as an entity communicating with a first base station 151 and/or a second base station 161 or another UE. The UE 100 may be fixed or mobile, and may refer to any device capable of transmitting and receiving data and/or control information to and/or from the base station 151 or 161 by wirelessly communicating with the base station 151 or 161. For example, the UE 100 may be referred to as a terminal, a terminal equipment, a mobile station (MS), a mobile terminal (MT), a user terminal (UT), a subscriber station (SS), a wireless device, a handheld device, etc. As illustrated in FIG. 1, the UE 100 may include first through $m^{th}$ subscriber identity modules (SIMs) 110_1 through 110_m, a multi-SIM processor 120, a radio-frequency integrated circuit (RFIC) 130, and an antenna array 140.

The first base station 151 or the second base station 161 may be an entity that communicates with the UE 100 and allocates a communication network resource to the UE 100, and may refer to a fixed station communicating with the UE 100 and/or another base station. In some embodiments, a base station (e.g., the first base station 151) may exchange data and control information with another base station (e.g., a second base station 161) by communicating with the other station (e.g., the second base station 161). For example, the first base station 151 or the second base station 161 may be referred to as a Node B, an evolved Node B (eNB), a next-generation Node B (gNB), a sector, a site, a base transceiver system (BTS), an access point (AP), a relay node, a remote radio head (RRH), a radio unit (RU), a small cell, etc. Herein, a base station or a cell may be interpreted as a generic meaning of some area or function covered by a base station controller (BSC) in CDMA, a Node-B in WCDMA, an eNB in 4G LTE, a gNB or sector (site) in 5G NR, etc., and may include various coverage areas such as megacells, macrocells, microcells, picocells, femtocells, relay nodes, RRHs, RUs, small cell communication ranges, etc.

As illustrated in FIG. 1, the first base station 151 may be included in the first network 150, and the second base station 161 may be included in the second network 160. The UE 100 may access the first network 150 through the first base station 151 and may access the second network 160 through the second base station 161. The UE 100 may communicate with the first network 150 and the second network 160 according to random-access technology (RAT). For example, in a 5G NR system or a 4G LTE system, as a non-limiting example, the UE 100 may communicate with the first network 150 and the second network 160 according to another RAT. The UE 100 may communicate with the first network 150 and the second network 160 according to the same RAT in some embodiments, and may communicate with the first network 150 and the second network 160 according to different RATs in some embodiments. The UE 100 may transfer information according to various multiple access schemes such as CDMA, frequency division multiple access (FDMA), time division multiple access (TDMA), orthogonal frequency division multiple access (OFDMA), single carrier-frequency division multiple access (SC-FDMA), OFDM-FDMA, OFDM-TDMA, OFDM-CDMA, etc., in the first network 150 or the second network 160. In this case, the UE 100 and the first base station 151 and the second base station 161 may communicate with each other, and transmit or receive signals (or data) through various channels.

The UE 100 may support multi-SIM wireless communication. For example, as illustrated in FIG. 1, the UE 100 may perform first wireless communication 11 related to the first SIM 110_1 with the first base station 151 included in the first network 150, and perform second wireless communication 12 related to the second SIM 110_2 with the second base station 161 included in the second network 160. In particular, when two wireless communications related to the two SIMs, that is, the first SIM 110_1 and the m$^{th}$ SIM 110_m, are performed, the UE 100 may be referred to as a dual-SIM device. The first wireless communication 11 and the second wireless communication 12 may be referred to as a first connection and a second connection and as a first subscription and a second subscription. In addition, exemplary embodiments of the inventive concept will be described mainly with reference to the two SIMs, that is, the first and second SIM 110_1 and 110_2, that is, a dual-SIM wireless communication, but it would be understood that exemplary embodiments of the inventive concept are applicable to a multi-SIM wireless communication including three or more SIMs. Moreover, aspects of the inventive concept may be applied to a single-SIM wireless communication including a single SIM device.

In some embodiments, the UE 100 may support MSMS. A transmission/reception radio frequency (RF) path of the UE 100 may be used by one of the first SIM 110_1 to the m$^h$ SIM 110_m according to a TDM scheme. That is, at a specific time, one of the first SIM 110_1 to the m$^{th}$ SIM 110_m may exclusively use a transceiver included in the RFIC 130, and one of the first SIM to the m$^{th}$ SIM 110_1 to 110_m may be activated to transmit and receive a transmission signal or a reception signal. Herein, the transmission/reception RF path may mean a path through which wireless RF resources move in terms of hardware, and the transmission/reception RF path may be referred to as a transceiver, a transmission/reception (Tx/Rx) module, or a Tx/Rx RF chain.

The multi-SIM processor 120 may communicate with the RFIC 130 through baseband signals RX and TX, and may be coupled to the first SIM to the m$^{th}$ SIM 110_1 to 110_m. The first SIM 110_1 may include information for accessing the first network 150 through the first wireless communication 11, and the second SIM 110_2 may include information for accessing the second network 160 through the second wireless communication 12. As will be described below with reference to FIG. 3, the multi-SIM processor 120 may have an architecture for processing a connection related to the first SIM 110_1 and a connection related to the second SIM 110_2. The multi-SIM processor 120 may transmit a signal associated with the first wireless communication 11 or the second wireless communication 12 based on a hardware component, e.g., an RF transmission path, etc., provided by the RFIC 130. The multi-SIM processor 120 may allocate one RF transmission path to the first wireless communication 11 or the second wireless communication 12 by controlling the RFIC 130. In some embodiments, the multi-SIM processor 120 may include a hardware block designed through logical synthesis, a software block including a series of instructions, a processing unit including at least one processor that executes the series of instructions, and a combination thereof. In some embodiments, the multi-SIM processor 120 may include a modem or a baseband processor.

The RFIC 130 may be a hardware device coupled to the antenna array 140 and the multi-SIM processor 120, and may provide wireless RF transmission/reception resources for wireless communications. For example, the RFIC 130 may provide a reception signal RX as a baseband signal to the multi-SIM processor 120 by processing an RF signal received from the antenna array 140, and provide the RF signal to the antenna array 140 by processing a transmission signal TX as the baseband signal. The transceiver (not shown) included in the RFIC 130 may be controlled by the multi-SIM processor 120, and may include, by way of a non-limiting example, a transceiver (or an RF transmission/reception path) including switches, matching circuits, filters, amplifiers, mixers, and the like. When a single RF transmission/reception path provided by the RFIC 130 in the UE 100 supporting MSMS according to an embodiment of the inventive concept is shared by the first SIM 110_1 and the second SIM 1102, the first wireless communication 11 and the second wireless communication 12 may use the RFIC 130 mutually exclusively, such that one of the first wireless communication 11 and the second wireless communication 12 may be suspended. For example, when the first wireless communication 11 is in an idle state, the first base station 151 may periodically transmit paging, which is related to a mobile termination (MT) call and may have a high priority, such that the second wireless communication 12 may be suspended in the UE 100 to effectively receive and process the paging.

In some embodiments, the UE 100 may support carrier aggregation (CA) using a plurality of carriers through the transceiver included in the RFIC 130. For example, the UE 100 may simultaneously use the first base station 151 and/or the second base station 161 and two or more carriers respectively referred to as component carriers (CCs) to transmit or receive data through one of the first SIM 110_1 to the m$^{th}$ SIM 110_m. The transceiver included in the RFIC 130 may form an RF transmission/reception path corresponding to CCs used in a carrier bundle, and may process signals transmitted/received through the RF transmission/reception path. In some embodiments, the transceiver included in the RFIC 130 may support multi-connectivity (MC).

The antenna array 140 may include at least one antenna, and receive an RF signal from the first base station 151 and the second base station 161 or transmit an RF signal to the first base station 151 and the second base station 161. In some embodiments, the antenna array 140 may include a plurality of antennas for multi-input multi-output (MIMO).

Figure 2:
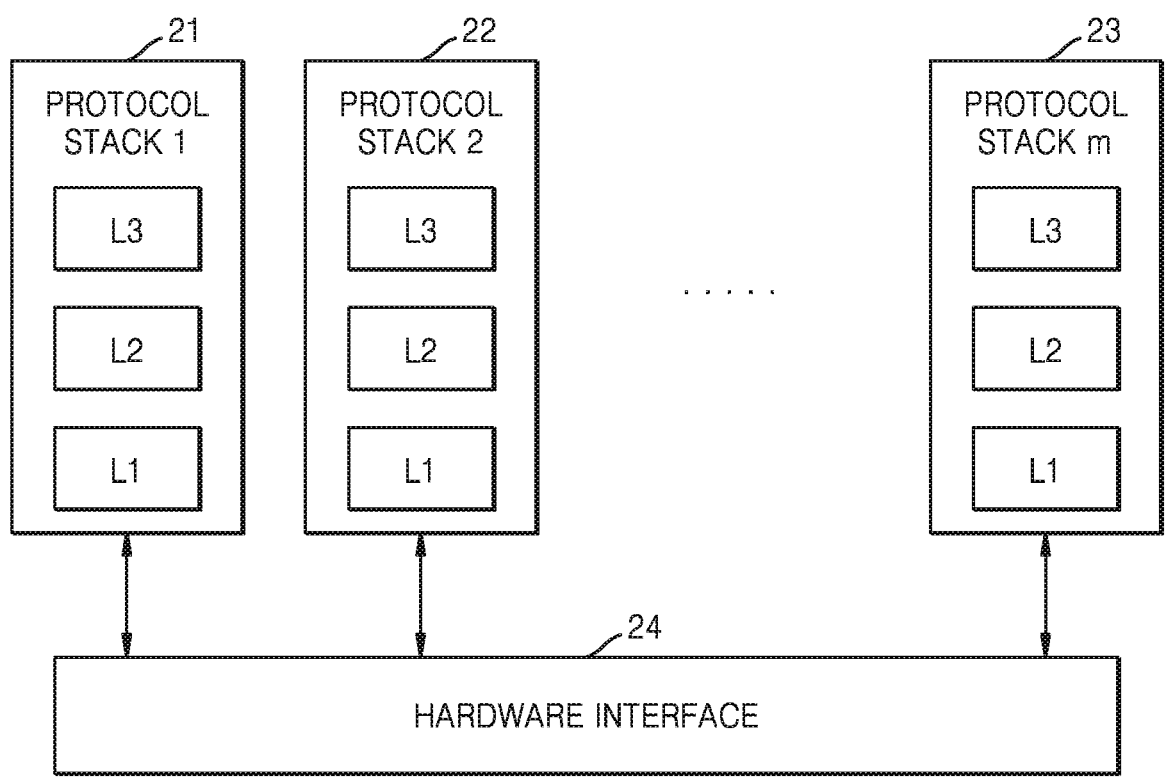
FIG. 2 is a conceptual diagram illustrating a protocol stack system according to an exemplary embodiment of the inventive concept.

FIG. 2 is a conceptual diagram illustrating a protocol stack system 20 according to an exemplary embodiment of the inventive concept.

More specifically, FIG. 2 illustrates a control plane of the protocol stack system 20 including a first protocol stack 21 and a second protocol stack 22. In some embodiments, the protocol stack system 20 of FIG. 2 may be implemented by the multi-SIM processor 120 of FIG. 1, and the multi-SIM processor 120 may perform operations for wireless communications through the protocol stack system 20 of FIG. 2. At least some of blocks illustrated in FIG. 2 may be implemented as hardware logic in some embodiments, or may be implemented as a software module executed by at least one processor in some embodiments. In some embodiments, the first protocol stack 21 and the second protocol stack 22 may be referred to as a first protocol software stack (PSS) 21 and a second PSS 22, respectively. In the present specification, operations of the first protocol stack 21 and the second protocol stack 22 may be understood as being performed by the multi-SIM processor 120.

Referring to FIG. 2, the protocol stack system 20 may include the first protocol stack 21 and the second protocol stack 22, which are respectively related to the first SIM 110_1 and the second SIM 110_2. As described above with reference to FIG. 1, each of the first protocol stack 21 and the second protocol stack 22 may support RAT. In some embodiments, the first protocol stack 21 and the second protocol stack 22 may interact with a shared upper layer, e.g., an application layer, and the upper layer may obtain information about the first wireless communication 11 and the second wireless communication 12 or provide an interface for programs providing commands. The upper layer may be implemented in the multi-SIM processor 120 or in another device separated from the multi-SIM processor 120. The protocol stack system 20 may include a hardware interface 24 shared by the first protocol stack 21 and the second protocol stack 22. The hardware interface 24 may provide an interface for hardware, i.e., the RFIC 130 of FIG. 1, and the first protocol stack 21 and the second protocol stack 22 may provide a signal to the RFIC 130 through the hardware interface 24 or obtain a signal from the RFIC 130. In some embodiments, the hardware interface 24 may be referred to as a driver of the RFIC 130.

Each of the first protocol stack 21, the second protocol stack 22, and an $m^{th}$ protocol stack 23 for a control plane may include a plurality of layers. As illustrated in FIG. 2, the first protocol stack 21 may include a first layer L1, a second layer L2, and a third layer L3, which may correspond to three lower layers of an open system interconnection (OSI) model, respectively. For example, in 4G LTE, 5G NR, etc., a physical (PHY) layer may be included in the first layer L1, a medium access control (MAC) layer, a radio link control (RLC) layer, and a packet data convergence protocol (PDCP) layer may be included in the second layer L2, and the RRC layer and a non-access stratum (NAS) layer may be included in the third layer L3. Like the first protocol stack 21, the second protocol stack 22 may also include a first layer L1, a second layer L2, and a third layer L3. In the present specification, when the first protocol stack (or the first PSS) 21 performs an operation, it may be indicated that the first SIM 110_1 performs the operation, and when the second protocol stack (or the second PSS) 22 performs an operation, it may be indicated that the second SIM 110_2 performs the operation.

Figure 3:
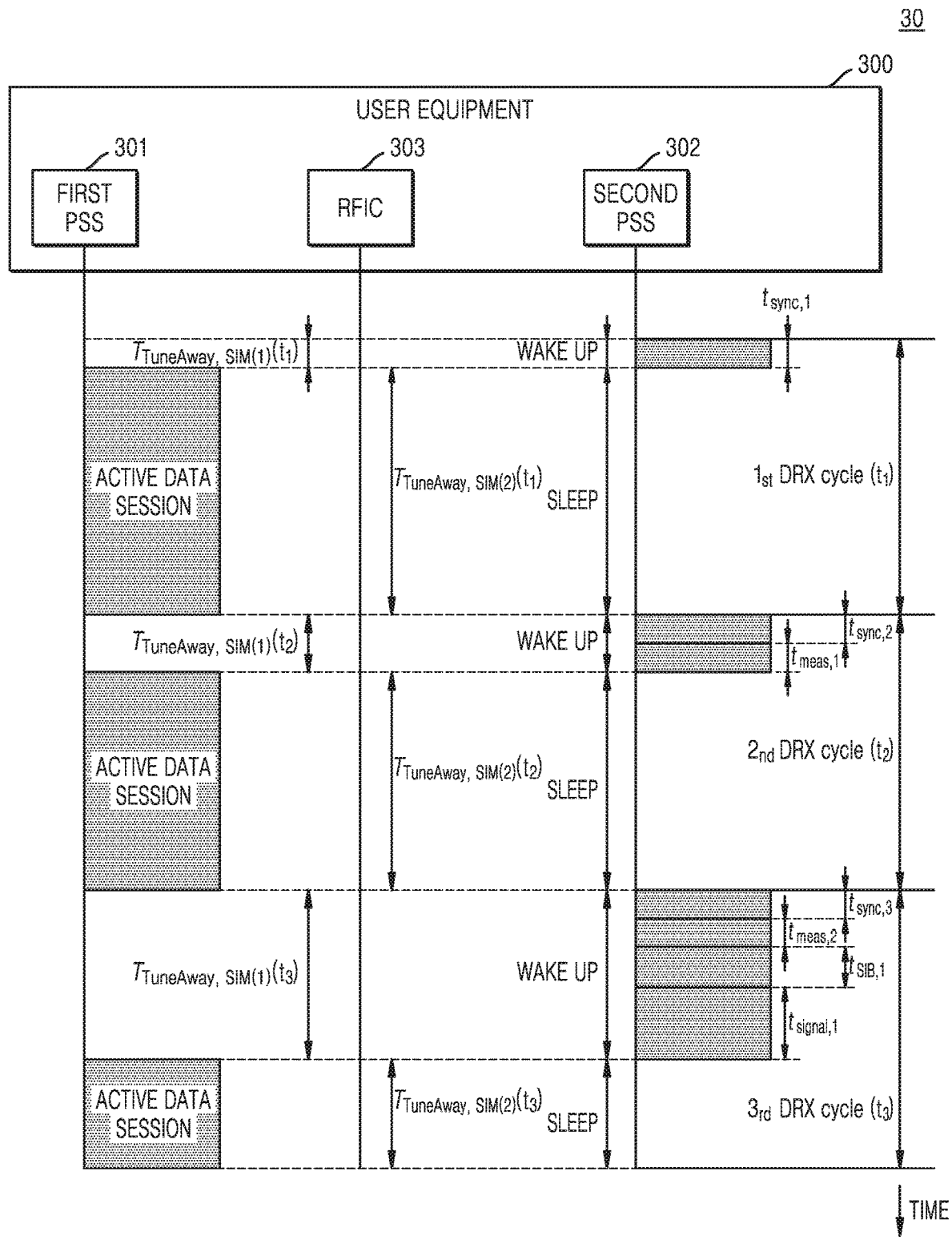
FIG. 3 illustrates an example of a tune-away model of a user equipment including multiple subscriber identity modules (SIMs), according to an exemplary embodiment of the inventive concept.

FIG. 3 illustrates an example of a tune-away model of a UE 300 including multiple SIMs, according to an exemplary embodiment of the inventive concept. Hereinbelow, FIG. 3 will be described with reference to FIG. 1.

Referring to FIG. 3, tune-away operations 30 of a first PSS 301 and a second PSS 302 for the UE 300 supporting dual SIM dual standby (DSDS) are illustrated over time. The UE 300 of FIG. 3 may be applied to the UE 100 of FIG. 1, the first PSS 301 and the second PSS 302 of FIG. 3 may be applied to the first SIM 110_1 and the second SIM 110_2 of FIG. 1, and the RFIC 303 of FIG. 3 may correspond to the RFIC 130 of FIG. 1.

Tune-away may refer to a method that allows a mobile device connected to one network and having a single RF chain to monitor another network or other networks.

The first PSS 301 associated with the first SIM 110_1 of FIG. 1 is in an RRC connected mode, and in this case, the first SIM 110_1 may be referred to as a primary SIM. The second PSS 302 associated with the second SIM 110_2 of FIG. 1 is in an RRC idle mode, and in this case, the second SIM 110_2 may be referred to as a secondary SIM.

For example, when the second PSS 302 requests the use of the RFIC 303 to the UE 300 (or the multi-SIM processor 120 of the UE 100 of FIG. 1) to perform a high-priority task, the UE 300 (or the multi-SIM processor 120 of the UE 100 of FIG. 1) may switch the RFIC 303 allocated to the first PSS 301 to the second PSS 302, and the first PSS 301 may enter the RRC idle mode. Such a series of operations may be defined as tune-away operations of the first PSS 301. The first PSS 301 may not receive data during a tune-away duration that is a time during which a tune-away operation is performed.

For example, a time in which the RFIC 303 is switched to the second PSS 302 in view of the first PSS 301, i.e., a tune-away duration of the first PSS 301 may be defined as $T_{TuneAway,SIM(1)}(t)$. Likewise, a time in which the RFIC 303 is switched to the first PSS 301 in view of the second PSS 302, i.e., a tune-away duration of the second PSS 302 may be defined as $T_{TuneAway,SIM(2)}(t)$.

A total sum t of the tune-away durations of the first PSS 301 and the second PSS 302 may be expressed as shown in Equation 1.

$$t = T_{TuneAway,SIM(1)}(t) + T_{TuneAway,SIM(2)}(t) \tag{1}$$

In addition, for example, the second PSS 302 may periodically wake up from a sleep state according to a discontinuous reception (DRX) cycle. One DRX cycle may include a wake-up duration (or a wake-up mode) and a sleep duration (or a sleep mode). A wake-up duration of the second PSS 302 may correspond to the tune-away duration $T_{TuneAway,SIM(1)}(t)$ of the first PSS 301, and a sleep duration of the second PSS 302 may correspond to the tune-away duration $T_{TuneAway,SIM(2)}(t)$ of the second PSS 302. During the sleep duration of the second PSS 302, the first PSS 301 may receive data upon activation of a data session.

For example, in a first DRX cycle ($t_1$), the second PSS 302 may perform timing synchronization during the wake-up duration. The UE 300 may obtain a result of measuring a signal of a serving cell corresponding to the second base station 161 of FIG. 1 through timing synchronization of the second PSS 302. In a second DRX cycle ($t_2$), the second PSS 302 may perform timing synchronization during the wake-up duration and monitor paging information from a base station (e.g., the first base station 151 or the second base station 161). In a third DRX cycle ($t_3$), the second PSS 302 may perform timing synchronization during the wake-up duration, monitor paging information from a base station (e.g., the first base station 151 or the second base station 161), perform neighbor cell measurement for cell reselection, and obtain a system information block (SIB) from or receive signaling from the base station (e.g., the first base station 151 or the second base station 161) after cell reselection. In the third DRX cycle ($t_3$), the second PSS 302 of the UE 300 may perform a cell reselection operation. During the wake-up duration of each DRX cycle, an operation of the second PSS 302 is exemplary, and the technical range of the inventive concept may not be limited thereto, such that various operations of the second PSS 302 may be applied according to various scenarios where a higher-priority task is performed first.

After completion of the above-described operations during the wake-up duration in each DRX cycle, the second PSS 302 may enter the sleep mode. During the sleep duration of the second PSS 302, the RFIC 303 may be occupied by the first PSS 301.

According to an embodiment of the inventive concept illustrated in FIG. 3, a tune-away duration of an $n^{th}$ PSS may be expressed as in Equation 2, in which n is equal to 1 and 2.

$$T_{TuneAway,SIM(n)}(t) = T_{TuneAway,SIM(n)}(t_1) + T_{TuneAway,SIM(n)}(t_2) + T_{TuneAway,SIM(n)}(t_3) \tag{2}$$

During the first DRX cycle($t_1$), the second DRX cycle($t_2$), and the third DRX cycle($t_3$), the tune-away duration of the first PSS 301 may be expressed as Equation 3, Equation 4, and Equation 5, respectively.

$$T_{TuneAway,SIM(1)}(t_1) = t_{sync,1} \tag{3}$$

$$T_{TuneAway,SIM(1)}(t_2) = t_{sync,2} + t_{meas,1} \tag{4}$$

$$T_{TuneAway,SIM(1)}(t_3) = t_{sync,3} + t_{sync,2} + t_{signal,1} + t_{SIB,1} \tag{5}$$

In Equations 3, 4, and 5, $t_{sync,i}$, $t_{meas,i}$, $t_{signal,i}$, and $t_{SIB,i}$ may respectively mean durations of an $i^{th}$ timing synchronization operation and a paging information monitoring operation, a duration of an $i^{th}$ neighbor cell measurement operation, an $i^{th}$ operation of signaling with a base station, and a duration of an $i^{th}$ SIB obtaining operation, in which i is equal to 1, 2, or 3.

As a result, the tune-away duration of the first PSS 301 may be expressed as shown in Equation 6.

$$T_{TuneAway,SIM(1)}(t) = \sum_{i=0}^{N_{sync}} t_{sync,i} + \sum_{i=0}^{N_{meas}} t_{meas,i} + \sum_{i=0}^{N_{signal}} t_{signal,i} + \sum_{i=0}^{N_{SIB}} t_{SIB,i} \quad (6)$$

Referring to Equation 6, $N_{sync}$, $N_{meas}$, $N_{signal}$, and $N_{SIB}$ may respectively mean the number of occurrences of a timing synchronization operation, a paging information monitoring operation, a neighbor cell measurement operation, an operation of signaling with a base station, and an SIB obtaining operation. When each of the above-described operations does not occur, $N_{sync}$, $N_{meas}$, $N_{signal}$, and $N_{SIB}$ have a value of 0, and initial values $t_{sync,0}$, $t_{meas,0}$, $t_{signal,0}$, and $t_{SIB,0}$ may correspond to 0.

Referring to Equation 6, data received during a time t in the first PSS 301 may be expressed as Equation 7 below.

$$Data_{SIM(1)}(t) = R \times (t - T_{TuneAway,SIM(1)}(t)) \quad (7)$$

In Equation 7, R may mean a downlink data rate (bit/sec), and may be referred to as a downlink data throughput. When R is a value determined by a capability of the UE 300, data received during the time t in the first PSS 301 may be determined by $T_{TuneAway,SIM(1)}(t)$. $(t-T_{TuneAway,SIM(1)}(t))$ may mean a duration during which the first PSS 301 occupies the RFIC 303, and may mean that data that may be received is maximum when $T_{TuneAway,SIM(1)}(t)$ has a minimum value. To improve data throughput, $T_{TuneAway,SIM(1)}(t)$ may be minimized, and an example of a method of reducing values of $N_{meas}$, $N_{signal}$, and $N_{SIB}$ according to Equation 6 to minimize $T_{TuneAway,SIM(1)}(t)$ will be described below with reference to FIG. 1, and FIGS. 4A through 4C.

Figure 4A:
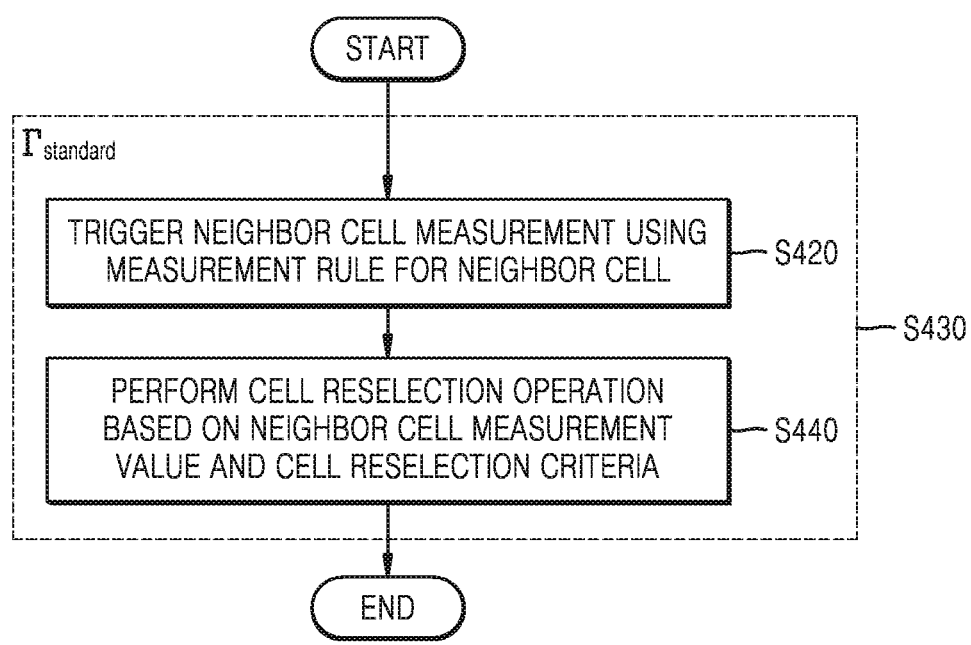
FIG. 4A is a flowchart illustrating a cell reselection operation of a user equipment (UE) according to an exemplary embodiment of the inventive concept.
Figure 4B:
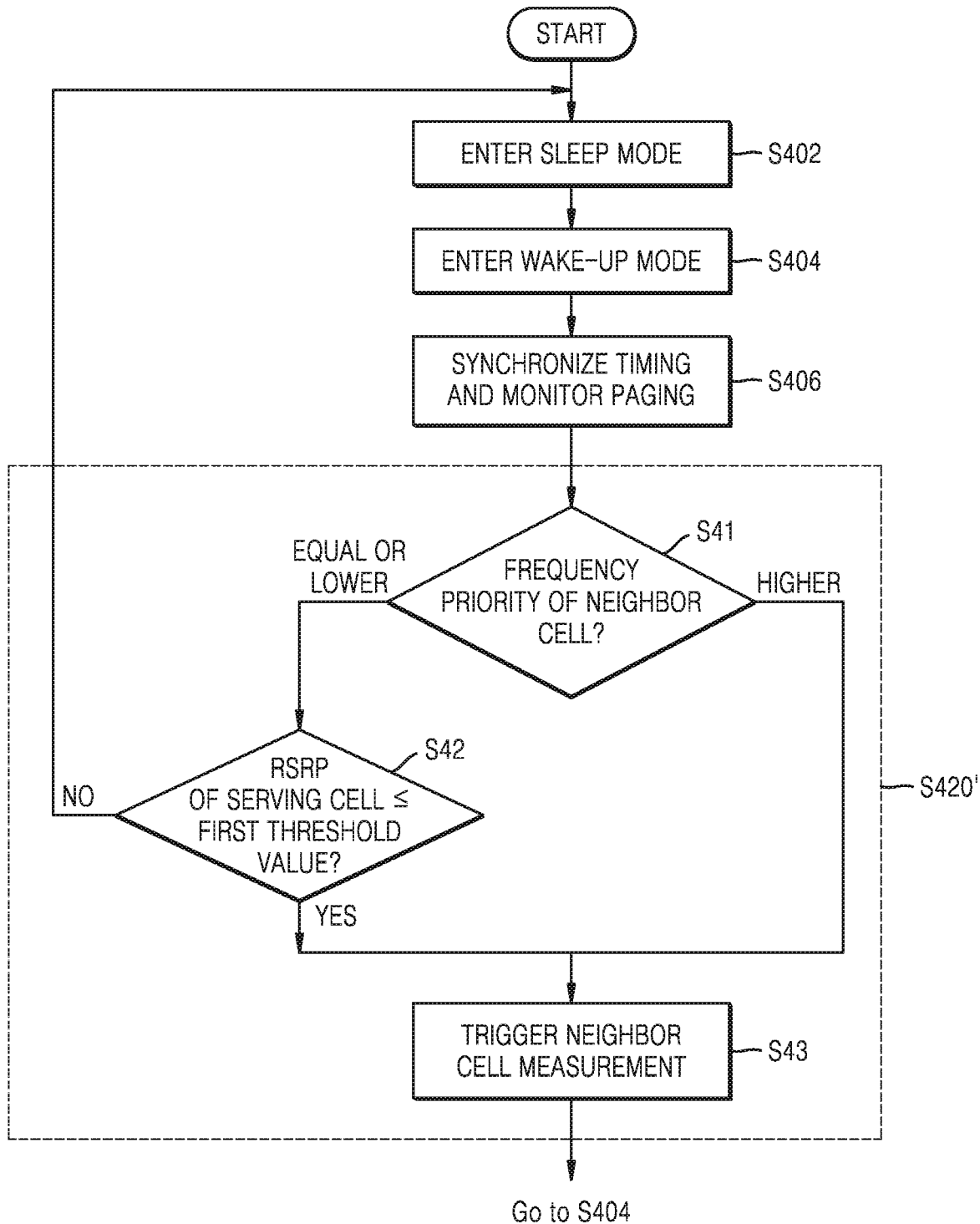
FIGS. 4B and 4C are flowcharts illustrating examples of operations S420 and S440 of FIG. 4A, respectively, according to an exemplary embodiment of the inventive concept.
Figure 4C:
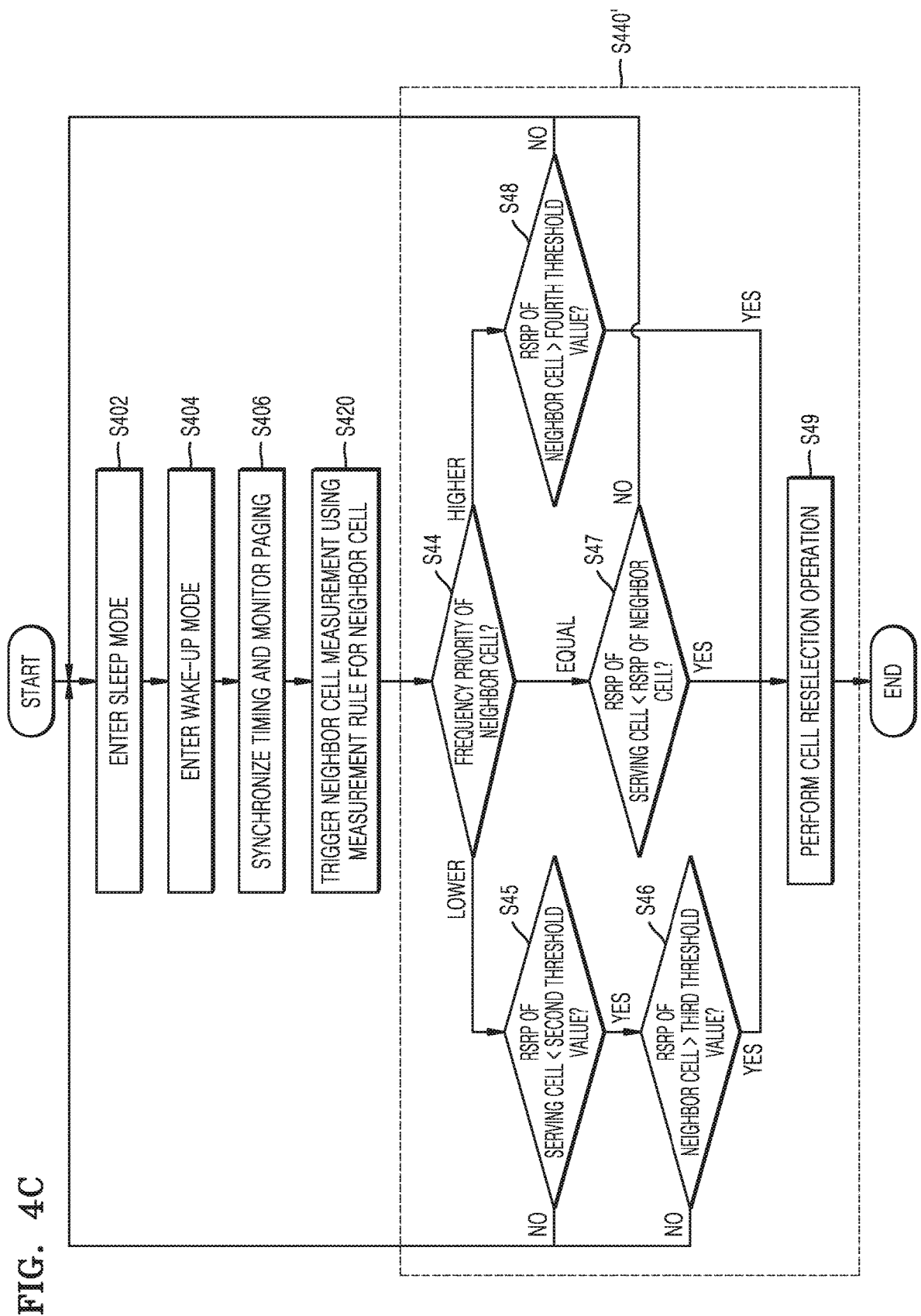

FIG. 4A is a flowchart illustrating a cell reselection operation of a user equipment according to an exemplary embodiment of the inventive concept, and FIGS. 4B and 4C are flowcharts illustrating examples of each of operations S420 and S440 of FIG. 4A, according to an exemplary embodiment of the inventive concept. Hereinbelow, FIGS. 4A through 4C will be described with reference to FIGS. 1 and 2.

Referring to FIG. 4A, a cell reselection operation of the UE 100 according to a cell reselection method of the $3^{rd}$ Generation Partnership Project (3GPP) standards is briefly described. The 3GPP provides measurement rules for a standard neighbor cell and cell reselection criteria, and a cell reselection method is identical in 5G NR and 4G LTE. The cell reselection operation of the UE 100 supporting DSDS according to an embodiment of the inventive concept is applicable to not only 4G LTE communication or 5G NR communication using dual SIMs, but also other wireless communications (e.g., $6^{th}$-Generation (6G)) having forward compatibility with 4G LTE communication or 5G NR communication.

The UE 100 according to an embodiment of the inventive concept may include the first SIM 110\_1, the second SIM 110\_2, and the first PSS 21 and the second PSS 22, which are respectively related to the first SIM 110\_1 and the second SIM 110\_2.

In the present specification, it is assumed that the first PSS 21 is in the RRC connected mode and the second PSS 22 is in the RRC idle mode. In addition, it is assumed that the second PSS 22 performs the second wireless communication 12 with the second base station 161, and the neighbor cell measurement and cell reselection operations to be described later are performed by the second PSS 22 in the RRC idle mode. The second base station 161 currently being connected (or camping) may correspond to a 'serving cell'.

The UE 100 according to an embodiment of the inventive concept may trigger neighbor cell measurement by using a measurement rule for a neighbor cell classified by a frequency type and a frequency priority, in operation S420. The 'neighbor cell' may mean a cell adjacent to the serving cell. For example, the second network 160 related to the second SIM 110\_2 may determine in advance how many neighbor cells are to be measured according to standards, and transmit a neighbor cell list of neighbor cells to be measured to the UE 100. Thus, the UE 100 may perform neighbor cell measurement for at least one neighbor cells included in the neighbor cell list. In the present specification, one neighbor cell is assumed mostly, but operations including technical characteristics of the inventive concept may be applied to each of a plurality of neighbor cells.

In some embodiments, the measurement rule for the neighbor cell may be classified according to an RAT type and frequency characteristics of the neighbor cell. That is, the triggering of the neighbor cell measurement may be determined according to the RAT type and the frequency characteristics of the neighbor cell.

The measurement rule for the neighbor cell may be classified based on the frequency type of the neighbor cell measurement. In an embodiment, the measurement rule may be classified based on an intra-frequency type, an inter-frequency type, and an inter system-frequency type.

The intra-frequency type may refer to a case where a serving cell of the UE and a neighbor cell to be measured by the UE have the same center frequency according to the same RAT. For example, the intra-frequency type may include a case where cell reselection is performed in a coverage of the second base station 161. The inter-frequency type may refer to a case where a serving cell of the UE and a neighbor cell to be measured by the UE have different center frequencies according to the same RAT. For example, the inter-frequency type may include a case where cell reselection from the second base station 161 included in an NR network to another base station included in the NR network is performed. The inter system-frequency type may mean a case where different RATs are provided. For example, the inter system-frequency type may include a case where cell reselection from the second base station 161 included in the NR network to another base station included in an LTE network is performed.

In an embodiment, the measurement rule for the neighbor cell may be classified based on the frequency priority of the neighbor cell. The measurement rule for the neighbor cell may determine whether the priority of the neighbor cell is lower than, the same as, or higher than that of the serving cell (i.e., a frequency priority) based on the center frequency. For example, the UE 100 may receive information including an absolute radio frequency channel number (ARFCN) and a priority designated by the second network 160 for each ARFCN from the second network 160 related to the second SIM 1102 through the second PSS 22. The ARFCN may mean a frequency channel number assigned for identification of a designated RF channel of a GSM wireless system, and may be referred to as an ARFCN, an ultra-ARFCN (U-ARFCN), an evolved-ARFCN (E-ARFCN), a New Radio-ARFCN (NR-ARFCN), etc., depending on a network type. The UE 100 may determine whether to camp in a cell having a center frequency through the information received from the second network 160.

A measurement rule for a neighbor cell classified according to the RAT and the frequency characteristics of the neighbor cell, and a detailed example of a corresponding neighbor cell measurement operation will be described below with reference to FIGS. 4B and 7.

The UE 100 may measure a neighbor cell (or the quality of a signal level from the neighbor cell) with respect to the neighbor cell for which measurement is triggered by the above-described criteria.

When neighbor cell measurement is triggered to obtain a neighbor cell measurement value, the UE 100 according to an embodiment of the inventive concept may perform a cell reselection operation based on a serving cell measurement value (hereinafter, referred to as a first measurement value), a neighbor cell measurement value (hereinafter, referred to as a second measurement value), and cell reselection criteria, in operation S440. The neighbor cell measurement result obtained by the UE 100 measuring the neighbor cell may be evaluated based on the cell reselection criteria.

In some embodiments, the cell reselection criteria may be classified according to the frequency priority of the neighbor cell. The cell reselection criteria may be classified according to whether the priority of the neighbor cell is lower than, the same as, or higher than that of the serving cell (i.e., the frequency priority). For example, the UE 100 may receive information including an ARFCN and a priority designated by the second network 160 for each ARFCN from the second network 160 related to the second SIM 110_2 through the second PSS 22, and may determine a center frequency of a cell to camp in based on the received information.

Detailed examples of the cell reselection criteria classified according to the frequency priority of the neighbor cell and a corresponding cell reselection operation will be described below with reference to FIGS. 4C and 7.

For example, operations S420 and S440 may be referred to as a first method $\Gamma_{standard}$ (operation S430) corresponding to the 3GPP standard or a standard scheme.

Referring to FIG. 4B, a flowchart illustrating an example of an operation of the UE 100 triggering neighbor cell measurement corresponding to operation S420 of FIG. 4A is illustrated.

In operation S402, the second PSS 22 of the UE 100 may enter the sleep mode in a DRX cycle.

In operation S404, the second PSS 22 may enter the wake-up mode in the DRX cycle.

In operation S406, the second PSS 22 entering the wake-up mode may synchronize timings and monitor paging.

In operation S420', like in operation S420 of FIG. 4A, the second PSS 22 may trigger neighbor cell measurement by using the measurement rule for the neighbor cell. In some embodiments of the inventive concept, operation S420' may include a plurality of operations S41 through S43. Operation S420' of FIG. 4B may be performed by the second PSS 22 of FIG. 2.

In operation S41, the second PSS 22 may determine the frequency priority of the neighbor cell. When the priority of the neighbor cell is determined to be the same as or lower than that of the serving cell, operation S42 may be performed subsequently.

In operation S42, the second PSS 22 may determine whether a measurement value $S_{rxlev,S}$ using reference signal received power (RSRP) of the serving cell is less than or equal to a first threshold value. The RSRP may be defined as a linear average value of strengths of a reference signal in a particular frequency bandwidth in watts. The measurement value $S_{rxlev,S}$ using the RSRP of the serving cell may be referred to as a 'first measurement value'.

The first threshold value may be defined as a threshold value for the measurement value $S_{rxlev,S}$ using the RSRP of the serving cell for triggering measurement of a neighbor cell having a non-large priority, and may have different values according to the frequency type of neighbor cell measurement. For the intra-frequency type, $S_{IntraP}$ may be used as the first threshold value, and for the inter-frequency type and the inter system-frequency type, $S_{nonIntraP}$ may be used as the first threshold value.

When the measurement value $S_{rxlev,S}$ using the RSRP of the serving cell is determined to be less than the first threshold value, the second PSS 22 may trigger neighbor cell measurement in operation S43. At this time, even when the frequency priority of the neighbor cell is not higher than the frequency priority of the serving cell, the UE 100 may perform neighbor cell measurement for reselecting the neighbor cell in a case where a reception signal level of the serving cell is not higher than that of the neighbor cell.

When the measurement value $S_{rxlev,S}$ using the RSRP of the serving cell is determined to be greater than or equal to the first threshold value, operation S402 may be performed subsequently.

In operation S41, when the priority of the neighbor cell is determined to be higher than that of the serving cell, operation S43 may be performed subsequently.

That is, in operation S43, the second PSS 22 may trigger neighbor cell measurement, regardless of the measurement value $S_{rxlev,S}$ using the RSRP of the serving cell.

Even when the measurement value $S_{rxlev,S}$ using the RSRP of the serving cell has a sufficiently large value, neighbor cell measurement may be performed due to the measurement rule for the neighbor cell.

After a plurality of operations S41 through S43 included in operation S420' are performed, operation S440 of FIG. 4A may be performed subsequently.

When the cell reselection criteria are satisfied during a specific time $T_{reselection}$ corresponding to a timer, a cell reselection operation may be performed based on the measurement value of the neighbor cell obtained in operation S420', in operation S440.

Referring to FIG. 4C, a flowchart illustrating an example of an operation of the UE 100 performing cell reselection corresponding to operation S440 of FIG. 4A is illustrated.

Operations S402 through S420 are omitted because they overlap with those of FIGS. 4A and 4B.

In operation S440', like in operation S440 of FIG. 4A, the second PSS 22 may perform a neighbor cell reselection operation based on the measurement value of the neighbor cell and the cell reselection criteria. In some embodiments, operation S440' may include a plurality of operations S44 through S49. Operation S440' of FIG. 4C may be performed by the second PSS 22 of FIG. 2.

In operation S44, the second PSS 22 may determine the frequency priority of the neighbor cell. When the priority of the neighbor cell is determined to be lower than that of the serving cell, operation S45 may be performed subsequently. When the priority of the neighbor cell is determined to be the same as that of the serving cell, operation S47 may be performed subsequently. When the priority of the neighbor cell is determined to be higher than that of the serving cell, operation S48 may be performed subsequently.

When the priority of the neighbor cell is determined to be lower than that of the serving cell, the second PSS 22 may determine whether the measurement value $S_{rxlev,S}$ using the RSRP of the serving cell is less than a second threshold value $Th_{S,LowP}$ in operation S45. When an operation of reselecting a neighbor cell having a low priority is performed, the second threshold value $Th_{S,LowP}$ may be defined as a threshold value for the measurement value $S_{rxlev,S}$ using the RSRP of the serving cell. When the measurement value $S_{rxlev,S}$ using the RSRP of the serving cell is determined to be greater than or equal to the second threshold value $Th_{S,LowP}$, operation S402 may be performed subsequently.

The measurement value $S_{rxlev,S}$ using the RSRP of the serving cell is determined to be less than the second threshold value $Th_{S,LowP}$, the second PSS 22 may determine whether a measurement value $S_{rxlev,X}$ using an RSRP of the neighbor cell is greater than a third threshold value $Th_{X,LowP}$. When an operation of reselecting a neighbor cell having a low priority is performed, the third threshold value $Th_{X,LowP}$ may be defined as a threshold value for the measurement value $S_{rxlev,X}$ using the RSRP of the neighbor cell. When the measurement value $S_{rxlev,X}$ using the RSRP of the neighbor cell is determined to be less than or equal to the third threshold value $Th_{X,LowP}$, operation S402 may be performed subsequently. The measurement value $S_{rxlev,X}$ using the RSRP of the neighbor cell may be referred to as a 'second measurement value'.

When the measurement value $S_{rxlev,X}$ using the RSRP of the neighbor cell is determined to be greater than the third threshold value $Th_{X,LowP}$, the second PSS 22 may perform a cell reselection operation in operation S49.

When the priority of the neighbor cell is determined to be the same as that of the serving cell, the second PSS 22 may determine whether the measurement value $S_{rxlev,S}$ using the RSRP of the serving cell is less than the measurement value $S_{rxlev,X}$ using the RSRP of the neighbor cell, in operation S47. When the measurement value $S_{rxlev,S}$ using the RSRP of the serving cell is determined to be less than the measurement value $S_{rxlev,X}$ using the RSRP of the neighbor cell, the second PSS 22 may perform the cell reselection operation in operation S49. When the measurement value $S_{rxlev,S}$ using the RSRP of the serving cell is determined to be greater than or equal to the measurement value $S_{rxlev,X}$ using the RSRP of the neighbor cell, operation S402 may be performed subsequently.

When the priority of the neighbor cell is determined to be higher than that of the serving cell, the second PSS 22 may determine whether a fourth threshold value $Th_{X,HighP}$ is less than the measurement value $S_{rxlev,X}$ using the RSRP of the neighbor cell, in operation S48. When an operation of reselecting a neighbor cell having a high priority is performed, a fourth threshold value $Th_{X,HighP}$ may be defined as a threshold value for the measurement value $S_{rxlev,X}$ using the RSRP of the neighbor cell. When the measurement value $S_{rxlev,X}$ using the RSRP of the neighbor cell is determined to be greater than the fourth threshold value $Th_{X,HighP}$, the second PSS 22 may perform the cell reselection operation in operation S49. When the measurement value $S_{rxlev,X}$ using the RSRP of the neighbor cell is determined to be less than or equal to the fourth threshold value $Th_{X,HighP}$, operation S402 may be performed subsequently.

According to a first method ($\Gamma_{standard}$) based on the 3GPP standards, referring to a case where the priority of the neighbor cell is determined to be higher than that of the serving cell in operation S41 of FIG. 4B and a case where the priority of the neighbor cell is higher than that of the serving cell in operation S44 of FIG. 4C, the UE 100 may trigger neighbor cell measurement regardless of a signal strength of the service cell or the measurement value of the neighbor cell may be evaluated by neighbor cell reselection criteria. Referring to a case where the priority of the neighbor cell is determined to be the same as that of the serving cell in operation S44 of FIG. 4C, cell reselection may be performed when a ranking of the neighbor cell is higher than that of the serving cell in spite of a sufficiently large magnitude of a signal of the serving cell. The ranking may refer to an order in which the UE ranks cells in the order of a magnitude of an index value for cell reselection evaluation based on a measurement value for a corresponding cell.

The first method ($\Gamma_{standard}$) according to the 3GPP standards without considering a signal strength of the serving cell may cause frequent cell reselection of the second PSS 22, resulting in a long tune-away duration of the first PSS 21. Therefore, as will be described below with reference to FIGS. 5 through 8, delaying an occurrence point in time of neighbor cell measurement or cell reselection as much as possible within an appropriate signal strength range allowing the UE 100 to perform the second wireless communication 12 with the second base station 161 may be a way to improve a downlink data throughput.

Figure 5:
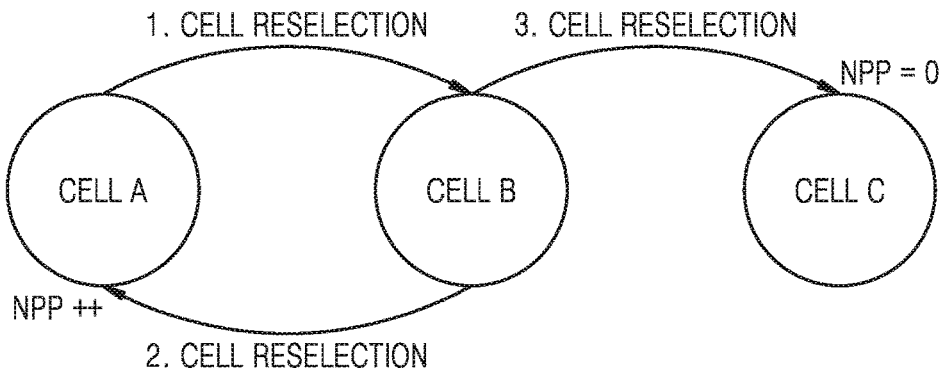
FIG. 5 illustrates an example of a method of considering a continuous ping-pong phenomenon in a case where a UE performs a cell reselection operation, according to an embodiment of the inventive concept.

FIG. 5 illustrates an example of a method of considering a continuous ping-pong sequence in a case where a user equipment performs a cell reselection operation, according to an embodiment of the inventive concept. Hereinbelow, FIG. 5 will be described with reference to FIGS. 1 and 2.

Referring to FIG. 5, Cell A assumes that the second PSS 22 is the second base station 161 in the RRC idle mode and accessed at a certain point in time, and Cell A may be referred to as a serving cell at a certain point in time. Cell B may be assumed to be a target base station (not shown) to be selected by cell reselection at a certain point in time, and Cell B may be referred to as a neighbor cell or a target cell at a certain point in time. Cell C may correspond to a neighbor cell that is different from Cell B.

For example, the UE 100 may perform cell reselection from Cell A to Cell B at a certain point in time (1. Cell Reselection), where Cell A is the serving cell and Cell B is the target cell. Thereafter, the UE 100 may perform cell reselection from Cell B to Cell A (2. Cell Reselection). Such operations may be defined as a ping-pong sequence (or just a "ping-pong"). Thus, a ping-pong may occur when a cell reselection procedure is repeated among a plurality of cells (e.g., Cell A and Cell B). When Cell A is an initial serving cell, Cell B is reselected and Cell A is thereafter reselected, a number of ping-pongs $N_{pp}$ considered in a second method ($\Gamma_{proposed}$) to be described below may increase by 1. Here, $N_{pp}$ is the number of ping-pongs occurring consecutively between two cells and may in general be 0 or a positive integer.

In addition, after a plurality of ping-pongs occur between Cell A and Cell B, the UE 100 may perform cell reselection from Cell B to Cell C (3. Cell Reselection). In this case, $N_{pp}$ between Cells B and C may be initialized to 0.

For one SIM in the RRC idle mode (e.g., the second SIM 110_2), by setting the number of ping-pongs occurring consecutively between two cells, $N_{pp}$, and reflecting $N_{pp}$ to neighbor cell measurement rules and cell reselection criteria, a penalty may be imposed on a cell where the ping-pong sequence occurs and neighbor cell measurement or cell reselection may be minimized. Thus, data may be stably received at a high data transmission rate from another SIM (e.g., the first SIM 110_1) in the RRC connected mode.

Figure 6:
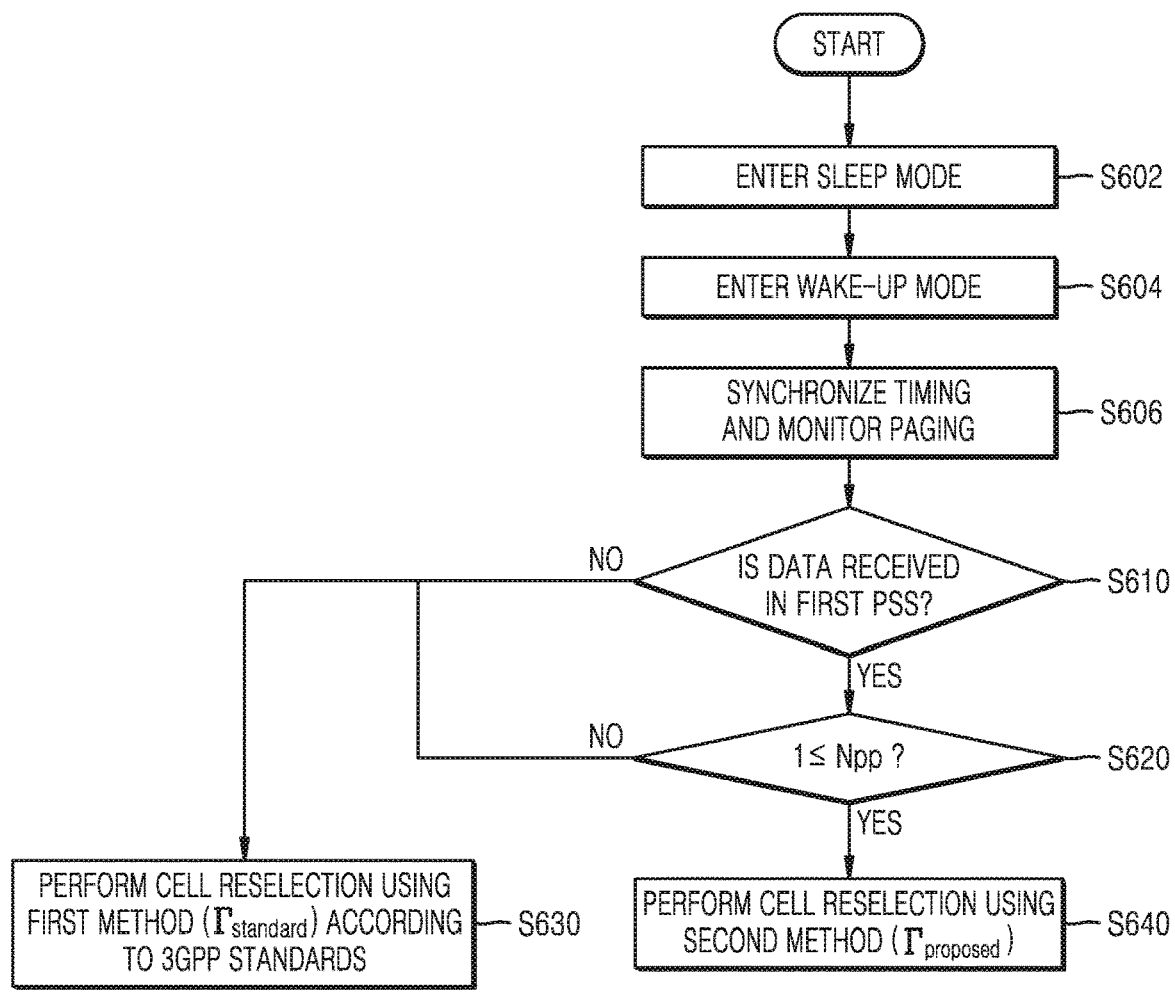
FIG. 6 is a flowchart illustrating a cell reselection operation of a UE according to an embodiment of the inventive concept.

FIG. 6 is a flowchart illustrating a cell reselection operation of a UE according to an embodiment of the inventive concept. Hereinbelow, FIG. 6 will be described with reference to FIGS. 1 and 2.

Referring to FIG. 6, the UE 100 may perform cell reselection based on two conditions by using the first method ($\Gamma_{standard}$) according to the 3GPP standards or the second method ($\Gamma_{proposed}$) proposed according to an embodiment of the inventive concept.

In operation S602, the second PSS 22 of the UE 100 may enter the sleep mode in a DRX cycle.

In operation S604, the second PSS 22 may enter the wake-up mode in the DRX cycle.

In operation S606, the second PSS 2 entering the wake-up mode may synchronize timings and monitor paging.

In operations S610 and S620, when the first PSS 21 is not receiving data or the number of ping-pongs consecutively occurring between the two cells, $N_{pp}$, is determined to be 0, the second PSS 22 may perform cell reselection by using the first method ($\Gamma_{standard}$) in operation S630. It is noted here that throughout this description, $N_{pp}$ may be determined as a number of ping-pongs that have occurred over a predetermined period of time, e.g., measured in seconds or minutes. For example, when the predetermined period of time elapses, $N_{pp}$ may be automatically reset to zero. The predetermined period of time may be determined in accordance with a current environment of the UE, e.g., the speed at which the UE is moving through cell regions.

The first method ($\Gamma_{standard}$) in operation S630 may correspond to the first method ($\Gamma_{standard}$) according to the 3GPP standard described above with reference to FIGS. 4A to 4C (see operation S430), and a redundant description thereof is omitted.

On the other hand, in operations S610 and S620, when the first PSS 21 is receiving data and the number of ping-pongs consecutively occurring between the two cells, $N_{pp}$, is determined to be greater than or equal to 1, the second PSS 22 may perform cell reselection by using the second method ($\Gamma_{proposed}$) in operation S640. The second method ($\Gamma_{proposed}$) of operation S640 may be referred to as a proposed scheme and will be described below with reference to FIG. 7.

Summarizing operations S610 to S640, neighbor cell measurement and cell reselection of the second PSS 22 may be expressed as Equation 8 below.

$$\Gamma = \begin{cases} \Gamma_{proposed} & \text{for data is enabled and } N_{pp} \geq 1 \\ \Gamma_{standard} & \text{for data is not enabled or } N_{pp} < 1 \end{cases} \quad (8)$$

Figure 7:
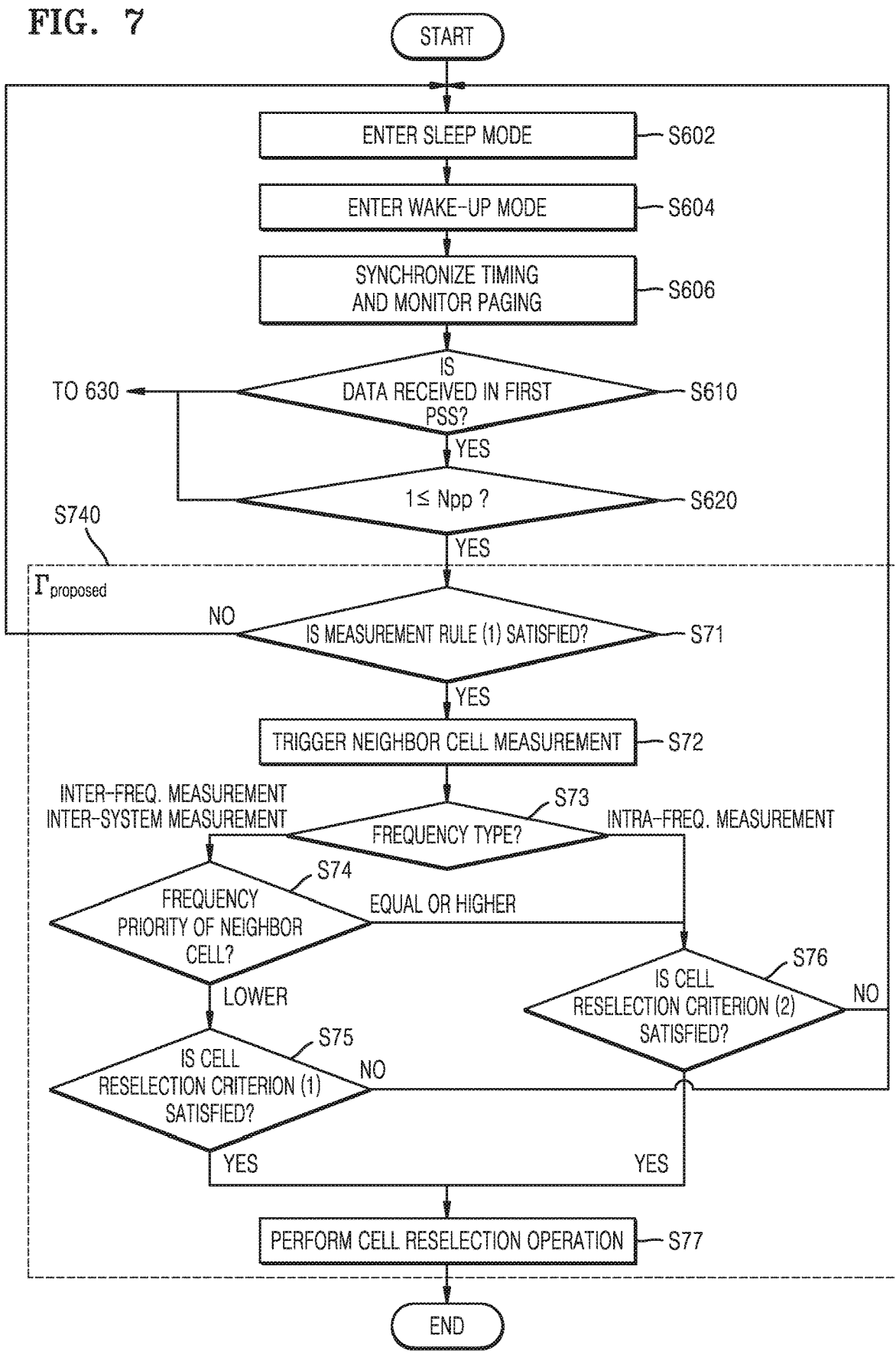
FIG. 7 is a flowchart illustrating an example of operation S640 of FIG. 6 according to an embodiment of the inventive concept.

FIG. 7 is a flowchart illustrating an example operation, S740, of operation S640 of FIG. 6 according to an embodiment of the inventive concept. Hereinbelow, FIG. 7 will be described with reference to FIGS. 1 and 2.

Operations S602 to S620 in FIG. 7 may be the same as those described above for FIG. 6. If operation S620 determines that there was at least one ping-pong ($1 \leq N_{pp}$, YES) then the flow proceeds to operation S740, which includes operations S71 through S76. Operation S740 of FIG. 7 may be performed by the second PSS 22 of FIG. 2.

In operation S71, the second PSS 22 may determine whether neighbor cell measurement rules corresponding to Equation 9 below are satisfied. Equation 9, which may be referred to as 'Measurement Rule (1)', may be applied to a neighbor cell having any priority and may be based on operation S42 of FIG. 4B.

$$S_{rxlev,S} \leq \text{Max}(S_{nonIntraP} - \alpha(N_{pp}-1) Th_{S,LowP}) \quad (9)$$

In Equation 9, $S_{nonIntraP} - \alpha(N_{pp}-1)$ may be defined as a 'first boundary condition' for triggering neighbor cell (e.g., Cell B of FIG. 6) measurement, and $Th_{S,LowP}$ may be defined as a 'second boundary condition' for triggering neighbor cell measurement. The greater value between the first boundary condition and the second boundary condition may be a threshold value for the measurement value $S_{rxlev,S}$ using the RSRP of the serving cell (e.g., Cell A of FIG. 6).

$S_{rxlev,S}$, $S_{nonIntraP}$, $Th_{X,LowP}$ may correspond to threshold values specified by the 3GPP standards, as described in detail with reference to FIGS. 4A through 4C. $S_{rxlev,S}$ may indicate a measurement value using an RSRP of a serving cell, $S_{nonIntraP}$ may indicate a threshold value for the measurement value $S_{rxlev,S}$ using the RSRP of the serving cell for triggering measurement of a neighbor cell having a non-large priority, and $Th_{X,LowP}$ may indicate a threshold value for the measurement value $S_{rxlev,X}$ using the RSRP of the neighbor cell when an operation of reselecting a neighbor cell having a low priority is performed.

$S_{nonIntraP} - \alpha(N_{pp}-1)$ may decrease as $N_{pp}$ increases, such that Measurement Rule (1) may result in less neighbor cell measurement as $N_{pp}$ increases. OT may indicate a weight factor for the number of ping-pongs $N_{pp}$ consecutively occurring between two cells, and may be a parameter for imposing a penalty to a cell where at least one ping-pong occurs.

According to Equation 6 and Equation 7, a reduction in $N_{meas}$ may cause a reduction in $T_{TuneAway,SIM(1)}(t)$, and as $T_{TuneAway,SIM(1)}(t)$ has a shorter total duration, data throughput for transmit/receive operations associated with the first PSS 301 of FIG. 3 may increase.

In addition, in Equation 9, by using $Th_{S,LowP}$ as well as $S_{nonIntraP} - \alpha(N_{pp}-1)$ as a boundary condition, a situation in which a neighbor cell could be permanently or excessively measured as $N_{pp}$ increases continuously, may be prevented.

When Measurement Rule (1) is satisfied, then in operation S72 a neighbor cell measurement is triggered by the above-described criteria. As noted earlier, a "neighbor cell measurement" may be a measurement of signal quality of a signal transmitted by the neighbor cell.

When Measurement Rule (1) is determined not to be satisfied, operation S604 according to the DRX cycle may be performed subsequently without entering a cell reselection procedure.

In operation S73, the second PSS 22 may determine a frequency type between a serving cell and a neighbor cell in neighbor cell measurement. Cell reselection criteria may differ with RAT types of the serving cell and the neighbor cell and whether frequency characteristics of the serving cell are the same as the neighbor cell.

For the inter-frequency type or the inter system-frequency type, operation S74 may be performed subsequently, and for the intra-frequency type, operation S76 may be performed subsequently.

In operation S74, the second PSS 22 may determine the frequency priority of the neighbor cell. The frequency priority may mean a priority assigned by a network to a frequency corresponding to each cell. When the priority of the neighbor cell is determined to be lower than that of the serving cell, operation S75 may be performed subsequently. When the priority of the neighbor cell is determined to be the same as or higher than that of the serving cell, operation S76 may be performed subsequently.

For neighbor cell measurement, when it is determined that the frequency type is the inter-frequency type or the inter system-frequency type and the priority of the neighbor cell is lower than that of the serving cell, the second PSS 22 may determine whether cell reselection criteria based on Equation 10 are satisfied in operation S75.

$$S_{rxlev,S} < Th_{S,lowP} \text{ and } S_{rxlev,S} > Th_{X,LowP} \quad (10)$$

Operation S75 may correspond to operations S45 and S46 of FIG. 4C. That is, operation S75 may be the same as an operation of reselecting a neighbor cell having a low priority in a first method according to the 3GPP standards.

When Equation 10, which may be referred to as 'Cell Reselection Criterion (1)', is determined to be satisfied, operation S77 may be performed subsequently and the second PSS 22 may perform the cell reselection operation.

When Cell Reselection Criterion (1) is determined not to be satisfied, operation S704 operating according to the DRX cycle may be performed subsequently without entering a cell reselection procedure.

For neighbor cell measurement, when it is determined that the frequency type is the inter-frequency type or the inter system-frequency type and the priority of the neighbor cell is equal to or higher than that of the serving cell, or when the frequency type is determined to be the intra-frequency type in neighbor cell measurement, the second PSS 22 may determine whether cell reselection criteria based on Equation 11 are satisfied in operation S76. In addition, Equation 11 may be referred to as Cell Reselection Criterion (2).

$$S_{rxlev,X} > Th_{X,HighP} \text{ and } S_{rxlev,X} > \text{Min}(S_{rxlev,S} + \alpha(N_{pp}-1) \cdot Th_{X,LowP}) \quad (11)$$

In Equation 11, $S_{rxlev,S}+\alpha(N_{pp}-1)$ may be defined as 'Third Boundary Condition' for cell reselection in the serving cell, and $Th_{X,LowP}$ may be defined as 'Fourth Boundary Condition' for cell reselection in the serving cell. The less value between the third boundary condition and the fourth boundary condition may be a threshold value for the measurement value $S_{rxlev,S}$ using the RSRP of the serving cell (e.g., Cell B of FIG. 6).

$S_{rxlev,S}+\alpha(N_{pp}-1)$ may have a greater value as $N_{pp}$ increases, such that Cell Reselection Criterion (1) may cause less neighbor cell reselection to occur as $N_{pp}$ increases. According to Equation 6 and Equation 7, a reduction in $N_{signal}$ and a reduction in $N_{SIB}$ may cause a reduction in $T_{TuneAway,SIM(1)}(t)$, and as $T_{TuneAway,SIM(1)}(t)$ has a shorter total duration, data throughput with respect to data transmitted/received by the first PSS 301 of FIG. 3 may increase.

Neighbor cell measurement may be triggered and cell selection is performed, regardless of a signal strength of the serving cell, when the priority of the neighbor cell is determined to be higher than that of the serving cell in the first method of FIG. 4C, whereas, in the second method of FIG. 7, to use a condition related to the serving cell even when the priority of the neighbor cell is higher than that of the serving cell, Cell Reselection Criterion (2) corresponding to Equation 11 may be used based on operations S47 and S48 of FIG. 4 corresponding to a case where the priority of the neighbor cell is higher than or the same as that of the serving cell.

When Cell Reselection Criterion (2) is determined to be satisfied, operation S77 may be performed subsequently and the second PSS 22 may perform the cell reselection operation.

When Cell Reselection Criterion (2) is determined not to be satisfied, operation S704 operating according to the DRX cycle may be performed subsequently without entering the cell reselection procedure.

Measurement Rule (1) and Cell Reselection Criterion (2) may be expressed as Equation 12 and Equation 13, respectively, by replacing an RSRP, which is an indicator of the strength of a reference signal, with reference signal received quality (RSRQ), which is an indicator of the quality of the reference signal.

$$S_{qual,S} \leq \text{Max}(S_{nonIntraQ}-\alpha(N_{pp}-1), Th_{S,LowQ}) \quad (12)$$

$$S_{qual,X} > Th_{X,HighQ} \text{ and } S_{qual,X} > \text{Min}(S_{qual,S}+\alpha(N_{pp}-1), Th_{X,LowP}) \quad (13)$$

Figure 8:
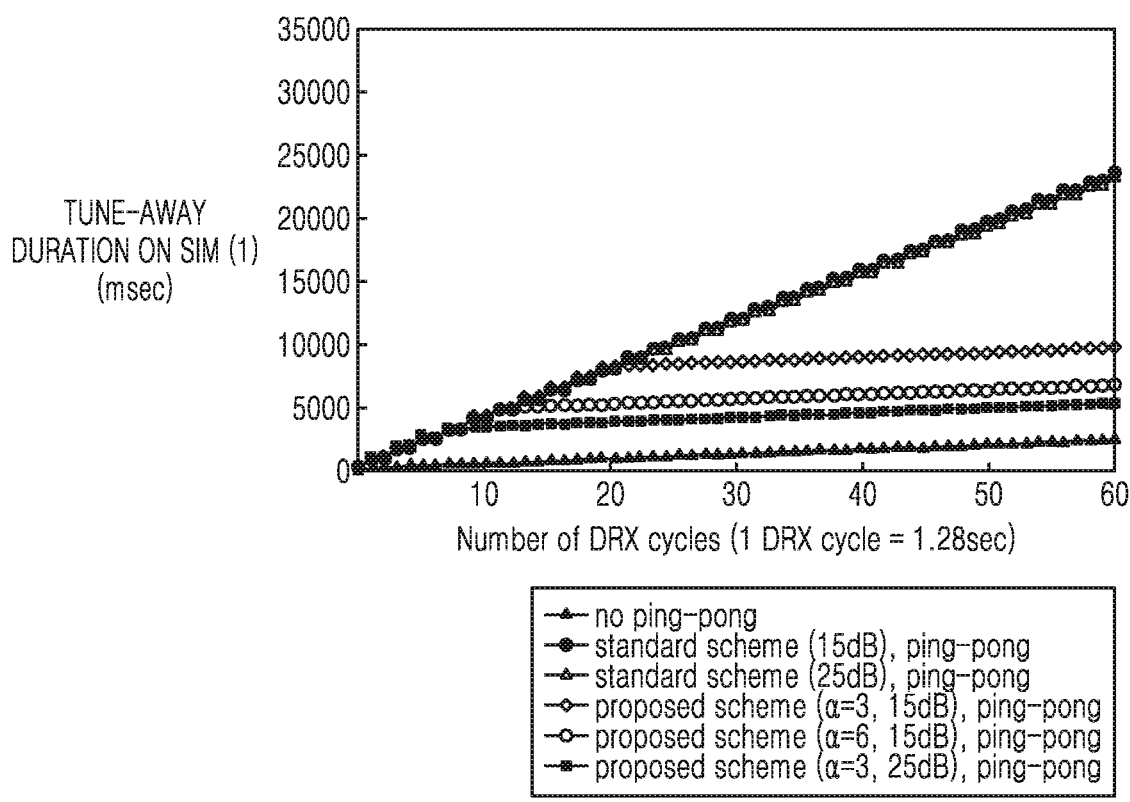
FIG. 8 is a graph illustrating a tune-away period of a first SIM regarding the number of discontinuous reception (DRX) cycles of a UE, according to an exemplary embodiment of the inventive concept.

FIG. 8 is a graph illustrating a tune-away period of a first SIM regarding the number of DRX cycles of a UE, according to an exemplary embodiment of the inventive concept.

FIG. 8 shows a graph of an example result of evaluating data throughput of the first SIM 110_1 of FIG. 1, when the cell reselection method according to the embodiment of FIG. 7 is applied to the second SIM 110_2 of FIG. 1 by using the tune-away model of FIG. 3.

As illustrated in the graph, in a DSDS device, the tune-away duration associated with a SIM in RRC connected mode is inversely correlated with data throughput for that SIM, because relatively more time is spent in the active data session (as illustrated in FIG. 3). As a corollary, the data throughput of the RRC connected SIM may be positively correlated with the tune-away duration for the other SIM operating in RRC idle mode. Thus, when the tune-away duration of the second PSS 22 related to the second SIM 110_2 of FIG. 1 in the RRC idle mode is relatively shorter, data throughput with respect to the first PSS 21 related to the first SIM 110_1 in the RRC connected mode is relatively higher.

Simulation for a performance test to derive a result graph of FIG. 8 may be performed under a certain condition. As a prerequisite for the performance test, the UE 100 including multiple SIMs in which the first SIM 110_1 communicates with the first network 150 corresponding to a 5G NR network and the second SIM 110_2 communicates with the second network 160 corresponding to a 4G LTE network is assumed.

As another prerequisite, referring to FIGS. 1 and 2, the first PSS 21 related to the first SIM 110_1 is assumed to be in the RRC connected mode and the second PSS 22 related to the second SIM 110_2 is assumed to perform cell reselection for two cells (e.g., Cell A and Cell B of FIG. 5) in the RRC idle mode. In addition, the two cells are assumed to have different center frequencies with different tracking area identifiers (TAIs). In another embodiment of the inventive concept, when both the first SIM 110_1 and the second SIM 110_2 are in the RRC idle mode, the cell reselection operation using the first method or the second method may be applied to the second PSS 22 as described in detail with reference to FIGS. 3 through 7. This case may have an effect corresponding to the embodiments of the inventive concept in that low-power consumption of the UE 100 rather than improved data throughput is made possible.

Simulation model and parameters may follow simulation model and parameters specified in the 3GPP standards, and parameters related to cell reselection may be as shown in Table 1.

TABLE 1

| Parameter | Value | Description |
| --- | --- | --- |
| $S_{rxelv,S}$ | 15 dB, 25 dB | Measured serving cell RSRP + $Q_{rxlevmin}$ |
| $S_{rxelv,X}$ | 15 dB, 25 dB | Measured neighbor cell RSRP + $Q_{rxlevmin}$ |
| $Q_{rxlevmin}$ | −124 dBm | Min. required RX level |
| $S_{nonIntraP}$ | 26 dB | $S_{rxlev,S}$ threshold for inter-freq. measurements |
| $Th_{S,LowP}$ | 2 dB | $S_{rxlev,S}$ threshold for reselecting towards a lower priority freq. |
| $Th_{X,HighP}$ | 8 dB | $S_{rxlev,X}$ threshold for reselecting towards a higher priority freq. |
| $Th_{X,LowP}$ | 10 dB | $S_{rxlev,X}$ threshold for reselecting towards a lower priority freq. |
| $P_S$ | 6 | Reselection priority for serving freq. |
| $P_X$ | 7 | Reselection priority for neighbor freq. |
| $T_{reselection}$ | 1 sec | Cell reselection timer |
| $L_{DRX}$ | 1.28 sec | DRX cycle length |

For example, a procedure of the second PSS 22 in the idle mode may test performance based on classification into three event sets. Each event set may be indicated by $E_m$ (m=1, 2, or 3) and $E_m=\{N_{sync}, N_{meas}, N_{signal}, N_{SIB}\}$ may be defined as an $m^{th}$ event set occurring during any one DRX cycle. The three event sets for testing performance according to an embodiment of the inventive concept are as below.

$E_1=\{1, 0, 0, 0\}$
$E_2=\{1, 1, 0, 0\}$
$E_3=\{1, 1, 1, 1\}$

A first event set $E_1$ may fail to satisfy Measurement Rule 1 of FIG. 8 and in this case, the UE 100 may perform timing synchronization and paging monitoring after entering the wake-up mode in the sleep mode.

A second event set $E_2$ may satisfy Measurement Rule 1 of FIG. 8, but fail to satisfy Measurement Rule 2, and in this case, the UE 100 may perform timing synchronization, paging monitoring, and neighbor cell measurement.

The second event set $E_2$ may satisfy Measurement Rule 1 and Measurement Rule 2 of FIG. 8, and in this case, the UE 100 may perform timing synchronization, paging monitoring, and neighbor cell measurement and may further obtain an SIB for a cell reselected after cell reselection and perform a tracking area update (TAU) procedure through a signaling message.

Table 2 below shows an example of the number of occurrences of each event set during 60 DRX cycles as a result of using the first method ($\Gamma_{standard}$) or the second method

TABLE 2

| Reselection Scheme | $N_{pp}$ | The number of the event set | | |
|---|---|---|---|---|
| | | $E_1$ | $E_2$ | $E_3$ |
| Standard scheme (15 dB) | 15 | 0 | 30 | 30 |
| Standard scheme (25 dB) | 15 | 0 | 30 | 30 |
| Proposed scheme ($\alpha$ = 3, 15 dB) | 5 | 40 | 10 | 10 |
| Proposed scheme ($\alpha$ = 6, 15 dB) | 3 | 48 | 6 | 6 |
| Proposed scheme ($\alpha$ = 3, 25 dB) | 2 | 52 | 4 | 4 |

Table 2 may differently set a weight value ($\alpha$) for the number of ping-pongs $N_{pp}$ and serving cell power, for each of the first method ($\Gamma_{standard}$) and the second method ($\Gamma_{proposed}$), and assume a plurality of divided reselection schemes. Among five reselection schemes (numbered sequentially from top), the first and second reselection schemes may correspond to the first method ($\Gamma_{standard}$) and the third through fifth reselection schemes may correspond to the second method ($\Gamma_{proposed}$).

According to Table 1, a neighbor cell has a higher priority than that of a serving cell, such that the first method ($\Gamma_{standard}$, a standard scheme) may trigger neighbor cell measurement during the first DRX cycle, regardless of signal strength/quality of the serving cell. Neighbor cell measurement may be performed again during the second DRX cycle, and when a measurement rule corresponding to operation S48 of FIG. 4C is satisfied during $T_{reselection}$, a cell reselection operation may be performed. During 60 DRX cycles, $N_{pp}$ may be 15, and each of the first event set and the second event set may occur once every 2 DRX cycles.

On the other hand, in the second method ($\Gamma_{proposed}$, a proposed scheme), $N_{pp}$, the number of occurrences of the second event set and the third event set may have a value less than that of the first method. In addition, for $\alpha=3$ and $S_{rxlev,S}=S_{rxlev,X}=15$ dB, after $N_{pp}$ reaches 5, neighbor cell measurement may be no longer triggered and cell reselection may occur no longer. In addition, it may be seen that as a weight value for the number of ping-pongs, $N_{pp}$, and the serving cell power increase, $N_{pp}$ and the number of occurrences of the second event set and the third event set decrease.

FIG. 8 shows $T_{TuneAway,SIM(1)}(t)$ including $t_{sync,i}$, $t_{meas,i}$, $t_{SIB,i}$, and $t_{signal,i}$ as well as the number of occurrences of an event set during 60 DRX cycles as a result of using the first method ($\Gamma_{standard}$) or the second method ($\Gamma_{proposed}$).

Referring to FIG. 8, in the first method according to the first and second reselection schemes, a ping-pong may continue to occur, such that $T_{TuneAway,SIM(1)}(t)$ may continuously increase, and in the second method according to the third through fifth reselection schemes, an increase rate of $T_{TuneAway,SIM(1)}(t)$ may decrease after the ping-pong is stopped.

Referring to Table 1 and Table 2, one DRX cycle may be 1.28 [sec] and t may mean the number of DRX cycles. Values of $t_{sync,i}$, $t_{signal,i}$, and $t_{SIB,i}$ measured in average may be 38 ms, 534 ms, and 134 ms, and a duration $t_{meas,1}$ of a first neighbor cell measurement operation may be measured as 24 ms and a duration of $t_{meas,2}$ of a second neighbor cell measurement operation may be measured as 11 ms. Timing synchronization of the neighbor cell in the first neighbor cell measurement is additionally required, such that the duration $t_{meas,1}$ of the first neighbor cell measurement operation may be longer than the duration of $t_{meas,2}$ of the second neighbor cell measurement operation.

In FIG. 8, a graph corresponding to 'no ping-pong' is intended for comparison with $T_{TuneAway,SIM(1)}(t)$ according to another reselection scheme, showing a result of configuration with one cell to cause occurrence of the first event set without occurrence of the ping-pong.

Figure 9:
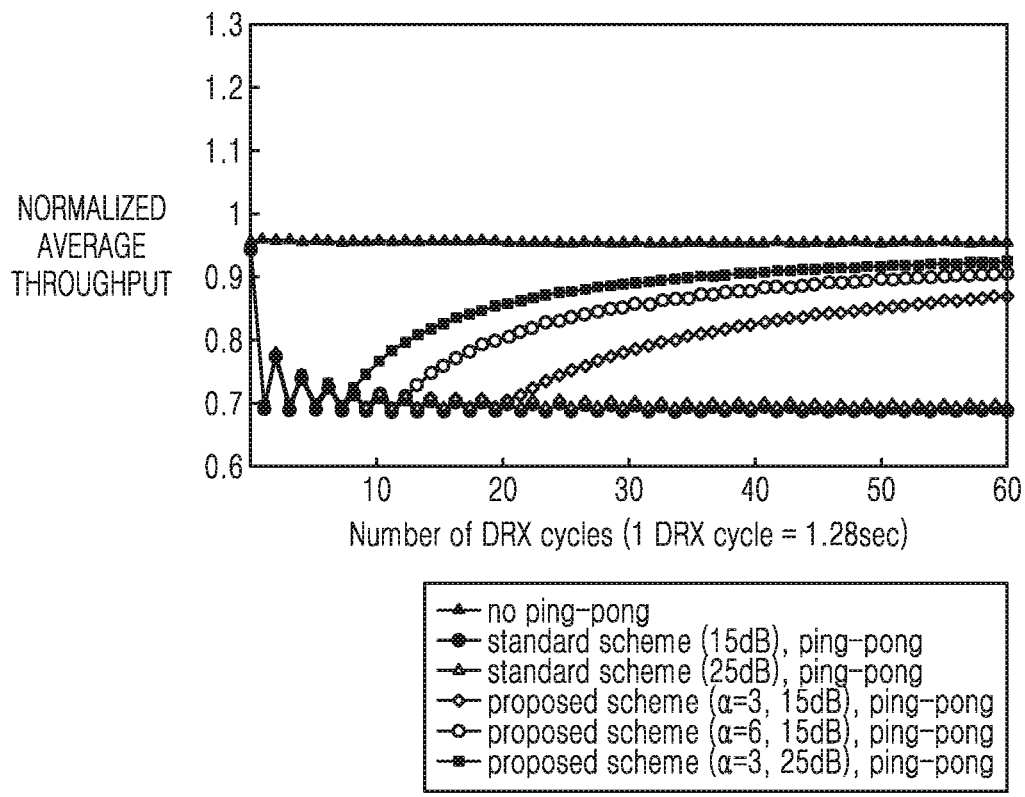
FIG. 9 is a graph illustrating a cumulatively normalized average data throughput in the first SIM while a cell reselection operation is performed in a second SIM of the UE, according to exemplary embodiments of the inventive concept.

FIG. 9 is a graph illustrating a cumulative normalized average data throughput in the first SIM while a cell reselection operation is performed in a second SIM of the UE, according to exemplary embodiments of the inventive concept.

Simulation for a performance test to derive a result graph may be performed under a certain condition, and a condition and/or a premise in the simulation for FIG. 9 is the same as a condition and/or a premise in FIG. 8, and thus a redundant description will not be provided below.

Referring to FIG. 9, the x-axis may mean the number of DRX cycles for one DRX cycle being 1.28, and the y-axis may mean a cumulative normalized average throughput of data received in the first SIM 110_1 while the second SIM 1102 performs cell reselection. On the y axis, 1 may mean the normalized average data throughput when a single SIM is used.

According to Equation 7 and FIGS. 8 and 9, it may be seen that as the tune-away duration of the second PSS 22 decreases, the data throughput of the data received in the first PSS 21 increases. More specifically, it may be seen that the data throughput increases by 26% relative to the first reselection scheme (15 dB) of the first method when a third reselection scheme ($\alpha=3$, 15 dB) of the second method is used, the data throughput increases by 31% relative to the first reselection scheme (15 dB) of the first method when the fourth reselection scheme ($\alpha=6$, 15 dB) of the second method is used, and the data throughput increases by 33% relative to the second reselection scheme (25 dB) of the first method when the fifth reselection scheme ($\alpha=3$, 25 dB) of the second method is used.

Figure 10:
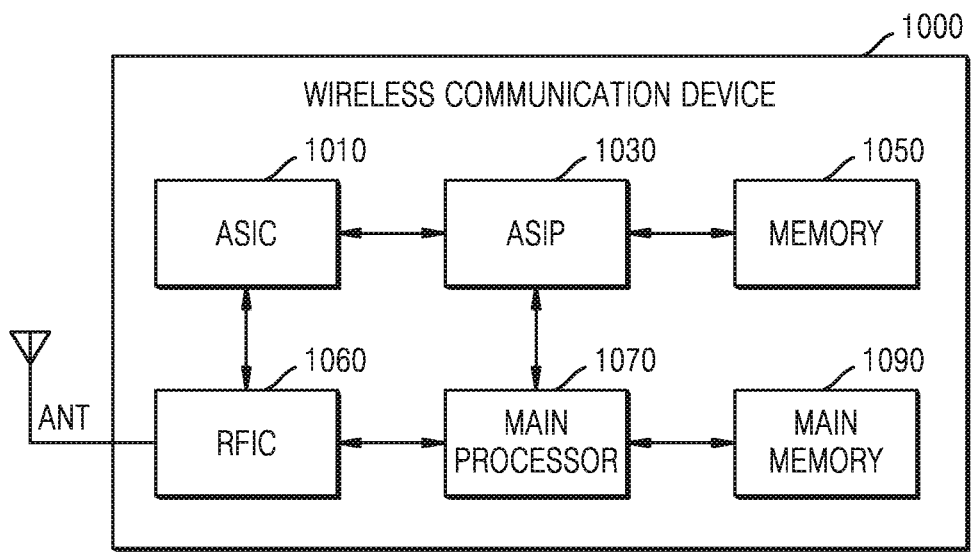
FIG. 10 is a block diagram illustrating an example of the UE of FIG. 1 according to an embodiment of the inventive concept.

FIG. 10 is a block diagram illustrating an example of the user equipment of FIG. 1 according to an embodiment of the inventive concept.

Referring to FIG. 10, a UE 1000 may include a modem (not shown) and an RFIC 1060, and may include an application specific integrated circuit (ASIC) 1010, an application specific instruction set processor (ASIP) 1030, a memory 1050, a main processor 1070, and a main memory 1090. The UE 1000 of FIG. 10 may be the UE 100 including multiple SIMs according to an embodiment of the inventive concept.

The RFIC 1060 may be connected to an antenna Ant to receive a signal from outside or transmit a signal to outside through a wireless communication network. The RFIC 1060 may include a transceiver. The RFIC 1160 may receive and transmit a plurality of carriers from and to a modem.

The ASIP 1030 is an integrated circuit customized for a specific purpose, and may support an instruction set dedicated to a particular application and execute an instruction included in the instruction set. The memory 1050 may communicate with the ASIP 1030 and, as a non-transitory storage device, store a plurality of instructions executed by the ASIP 1030. For example, the memory 1050 may include, as a non-limiting example, random-type memory accessible by the ASIP 1030, such as random-access memory (RAM), read only memory (ROM), a tape, a magnetic disk, an optical disk, a volatile memory, a non-volatile memory, and a combination thereof.

The main processor 1070 may control the UE 1000 by executing a plurality of instructions. For example, the main processor 1170 may control the ASIC 1010 and the ASIP 1030, process data received through a wireless communication network, or process a user input with respect to the UE 1000. According to an embodiment of the inventive concept, the main processor 1070 may control the second PSS 22 (of FIG. 2) to trigger measurement of a first neighbor cell based on a neighbor cell measurement rule considering a first measurement value for a serving cell and the number of ping-pongs between the serving cell and the first neighbor cell. The main processor 1070 may also control the second PSS 22 (of FIG. 2) to reselect the first neighbor cell based on a plurality of cell reselection criteria considering the first measurement value and the number of ping-pongs.

The main memory 1090 may communicate with the main processor 1070 and, as a non-transitory storage device, store a plurality of instructions executed by the main processor 1070. For example, the main memory 1090 may include, as a non-limiting example, random-type memory accessible by the main processor 1070, such as RAM, ROM, a tape, a magnetic disk, an optical disk, a volatile memory, a non-volatile memory, and a combination thereof. According to an embodiment of the inventive concept, the main memory 1090 may store information about a frequency priority, received from the network, measurement values of a serving cell and a neighbor cell, a plurality of threshold values included in a neighbor cell measurement rule or cell reselection criteria, etc.

The above embodiments are discussed in the context of cell reselection, which occurs in RRC idle mode. However, certain aspects of the inventive concept may be similarly applied to measurement decisions for handover, and handover decisions, which occur in RRC connected mode. In the RRC connected mode, a multi-SIM device or single-SIM device may reduce excessive handovers using analogous operations to those described above, e.g., by reducing "handover ping-pongs" akin to reducing cell reselection ping-pongs. This may result in reduced power consumption in the multi-SIM or single-SIM device, as well as conservation of system resources by the network otherwise used for the excessive handovers. For example, the "tune-away" times in FIG. 3 associated with the first PSS 301, which are the time intervals between the active data session intervals, may be utilized by the first PSS 301 for handover related signal measurements and handover implementations in the RRC connected mode, in an analogous manner as described above for the second PSS 302 operating in the RRC idle mode.

The above embodiments are also discussed in the context of a multi-SIM device. However, certain aspects may be applied in the same or similar manner to a single-SIM device. For instance, when the single-SIM device implements at least some of the above-described operations in FIGS. 4A through 7, benefits associated with reducing excessive instances of cell reselection may occur. Such benefits may include reduced power consumption in the single-SIM device, and reduced consumption of system resources for the cell reselection operations.

While the inventive concept has been particularly shown and described with reference to embodiments thereof, it will be understood that various changes in form and details may be made therein without departing from the spirit and scope of the following claims.

What is claimed is:

1. A user equipment (UE), comprising:
    a subscriber identity module (SIM) configured to perform communication with a serving cell of a network in a radio resource control (RRC) idle mode; and
    a processor configured to:
    trigger measurement of a neighbor cell signal based on a neighbor cell measurement rule that considers a measurement value of a serving cell signal and a number of cell reselection ping-pongs involving the UE that occurred between the serving cell and the neighbor cell in the RRC idle mode;
    determine a threshold value according to the number of cell reselection ping-pongs between the serving cell and the neighbor cell involving the UE, and a weight value for the number of cell reselection ping-pongs, wherein the measurement of the neighbor cell signal is triggered when the measurement value is less than or equal to the threshold value; and
    reselect the neighbor cell based on at least one cell reselection criterion considering the measurement value and the number of cell reselection ping-pongs.

2. The UE of claim 1, wherein the measurement value is a first measurement value, and the processor is further configured to:
    measure the neighbor cell signal; and
    obtain a second measurement value for the neighbor cell signal.

3. The UE of claim 2, wherein the serving cell signal is a reference signal of the serving cell, the neighbor cell signal is a reference signal of the neighbor cell, the first measurement value comprises a measurement value of reference signal received power (RSRP) or reference signal received quality (RSRQ) of the reference signal of the serving cell, and
    the second measurement value comprises a measurement value of RSRP or RSRQ of the reference signal of the neighbor cell.

4. The operating method of claim 3, wherein the at least one cell reselection criterion is determined according to radio access technology (RAT) types and frequency characteristics of the serving cell and the neighbor cell.

5. The UE of claim 1, wherein the neighbor cell is a first neighbor cell, and an interim number of cell reselection ping-pongs is initialized to 0 when the number of cell reselection ping-pongs equals or exceeds 1 and the UE reselects a second neighbor cell.

6. The UE of claim 1, wherein the communication with the serving cell of the network corresponds to 4th-Generation (4G) Long Term Evolution (LTE) network communication or 5th-Generation (5G) New Radio (NR) network communication.

7. An operating method of a user equipment (UE), comprising:
  performing communication associated with a subscriber identity module (SIM) of the UE with a serving cell of a network in a radio resource control (RRC) idle mode;
  triggering measurement of a neighbor cell signal based on a neighbor cell measurement rule that considers a measurement value of a serving cell signal and a number of cell reselection ping- pongs involving the UE that occurred between the serving cell and the neighbor cell;
  reselecting the neighbor cell based on at least one cell reselection criterion considering the measurement value and the number of cell reselection ping-pongs; and
  triggering measurement of the neighbor cell signal when the measurement value is less than or equal to a threshold value, wherein the threshold value is determined according to the number of cell reselection ping-pongs between the serving cell and the neighbor cell involving the UE, and a weight value for the number of cell reselection ping-pongs.

8. The operating method of claim 7, wherein the threshold value is inversely proportional to each of the number of cell reselection ping-pongs and the weight value.

9. The operating method of claim 8, wherein the threshold value is proportional to a number of times that the measurement of the neighbor cell signal is repeated.

10. An operating method of a user equipment (UE), comprising:
  performing communication associated with a subscriber identity module (SIM) of the UE with a serving cell of a network in a radio resource control (RRC) idle mode;
  triggering measurement of a neighbor cell signal based on a neighbor cell measurement rule that considers a measurement value of a serving cell signal and a number of cell reselection ping- pongs involving the UE that occurred between the serving cell and the neighbor cell in the RRC idle mode; and
  reselecting the neighbor cell based on a plurality of cell reselection criteria considering the measurement value and the number of cell reselection ping-pongs,
  wherein the plurality of cell reselection criteria are classified according to a frequency type between the serving cell and the neighbor cell, and
  the frequency type is classified into (i) an inter-frequency type or an inter system-frequency type; and (ii) an intra-frequency type.

11. The operating method of claim 10, further comprising:
  receiving information about a frequency priority of the neighbor cell from the network; and
  determining whether the frequency priority of the neighbor cell is lower than a frequency priority of the serving cell when the frequency type is the inter-frequency type or the inter system- frequency type.

12. The operating method of claim 11, wherein the plurality of cell reselection criteria comprise a first cell reselection criterion, and the measurement value is a first measurement value, and
  the operating method further comprises obtaining a second measurement value for the neighbor cell signal, and reselecting the neighbor cell based on the first cell reselection criterion when the frequency priority of the neighbor cell is determined to be lower than the frequency priority of the serving cell,
  wherein the first cell reselection criterion is a criterion of the first measurement value being less than a second threshold value and the second measurement value being greater than a third threshold value.

13. The operating method of claim 11, wherein the plurality of cell reselection criteria comprise a second cell reselection criterion, and
  the operating method further comprises reselecting the neighbor cell based on the second cell reselection criterion when the frequency priority of the neighbor cell is determined to be the same as or higher than the frequency priority of the serving cell.

14. The operating method of claim 13, wherein the second cell reselection criterion is determined according to the number of cell reselection ping-pongs between the serving cell and the neighbor cell and a weight value for the number of cell reselection ping- pongs, and
  the number of cell reselection ping-pongs and the weight value are proportional to a number of times that the measurement of the neighbor cell is repeated.

* * * * *